US012200423B2

(12) United States Patent
Xie et al.

(10) Patent No.: US 12,200,423 B2
(45) Date of Patent: Jan. 14, 2025

(54) WIRELESS HEADSET AND CONTROL BOX USED FOR WIRELESS HEADSET

(71) Applicant: HUAWEI TECHNOLOGIES CO., LTD., Guangdong (CN)

(72) Inventors: Huarong Xie, Dongguan (CN); Gaohui Wang, Dongguan (CN); Jianguang Wu, Dongguan (CN); Haowen Xu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 867 days.

(21) Appl. No.: 17/420,345

(22) PCT Filed: Oct. 28, 2019

(86) PCT No.: PCT/CN2019/113509

§ 371 (c)(1),
(2) Date: Jul. 1, 2021

(87) PCT Pub. No.: WO2020/155694

PCT Pub. Date: Aug. 6, 2020

(65) Prior Publication Data

US 2022/0095038 A1 Mar. 24, 2022

(30) Foreign Application Priority Data

Jan. 31, 2019 (CN) ......................... 201910098707.3

(51) Int. Cl.
*H04R 1/10* (2006.01)
*H01R 13/52* (2006.01)

(52) U.S. Cl.
CPC ....... *H04R 1/1041* (2013.01); *H01R 13/5219* (2013.01); *H04R 1/1016* (2013.01); *H01R 2201/00* (2013.01); *H04R 2420/09* (2013.01)

(58) Field of Classification Search
None
See application file for complete search history.

(56) References Cited

U.S. PATENT DOCUMENTS 5,197,899 A 3/1993 Akeda
2011/0170702 A1 7/2011 Bays
2013/0156217 A1 6/2013 Chiu et al.
(Continued)

FOREIGN PATENT DOCUMENTS

CN 2593252 * 12/2003
CN 2593252 Y 12/2003
CN 204836485 U 12/2015
(Continued)

OTHER PUBLICATIONS

Amphenol LTW ("UC-00PFFP-QS8001"), https://www.amphenolltw.com/product-info/USB/USB.TypeC2.0/UC20ML-NAML-QA001.html, (Year: 2016).*
(Continued)

*Primary Examiner* — Nafiz E Hoque

(57) ABSTRACT

A control box includes a female connector part and a male connector part. The plug end is housed in the female connector part when the male connector part is connected to the female connector part. The plug end is configured to plug into a power supply device when the male connector part is detached from the female connector part.

19 Claims, 12 Drawing Sheets

(56) References Cited

U.S. PATENT DOCUMENTS

| | | | |
|---|---|---|---|
| 2017/0195770 A1 | 7/2017 | Cheney et al. | |
| 2018/0109864 A1* | 4/2018 | Yamamoto ........... | H04R 1/1025 |

FOREIGN PATENT DOCUMENTS

| | | |
|---|---|---|
| CN | 204948300 U | 1/2016 |
| CN | 205376908 U | 7/2016 |
| CN | 205863507 U | 1/2017 |
| CN | 206323529 U | 7/2017 |
| CN | 206364323 U | 7/2017 |
| CN | 206686338 U | 11/2017 |
| CN | 207460443 U | 6/2018 |
| CN | 207677958 U | 7/2018 |
| CN | 207706393 U | 8/2018 |
| CN | 109218892 A | 1/2019 |
| CN | 208424687 U | 1/2019 |
| CN | 109756811 A | 5/2019 |
| CN | 109819366 A | 5/2019 |

OTHER PUBLICATIONS

Anonymous: "Amphenol LTW Catalogue", Jun. 15, 2017 (Jun. 15, 2017), pp. 1-23, XP093093397.

Anonymous: UC20ML-NAML-QA001 Amphenol LTW webpages, Oct. 19, 2023 (Oct. 19, 2023), pp. 1-3, XP093093398.

Anonymous: "Technical Drawing USB Type C to USB 2.0 Type Aplug",Jun. 15, 2016 (Jun. 15, 2016), pp. 1-1 XP093093399.

Anonymous: "Waterproof USB 3.0 Type C to USB Type A",Dec. 16, 2015 (Dec. 16, 2015), pp. 1-2, XP055877924,total:2pages.

* cited by examiner

WIRELESS HEADSET AND CONTROL BOX USED FOR WIRELESS HEADSET

CROSS-REFERENCE TO RELATED APPLICATIONS

This application is a national stage of International Application No. PCT/CN2019/113509, filed on Oct. 28, 2019, which claims priority to Chinese Patent Application No. 201910098707.3, filed on Jan. 31, 2019. Both of the aforementioned applications are hereby incorporated by reference in their entireties.

TECHNICAL FIELD

Embodiments of this application relate to the field of wireless headset technologies, and in particular, to a wireless headset and a control box used for a wireless headset.

BACKGROUND

A Bluetooth headset is implemented by applying a Bluetooth technology to a handsfree headset. Wire control components of the Bluetooth headset usually include a battery and an exposed charging interface, and the charging interface is usually a USB female connector. During charging, a user needs to plug a data cable into the charging interface, to charge the battery through the data cable. This charging manner requires the user to carry the data cable at any time, and charging cannot be performed without the data cable. Consequently, charging of the Bluetooth headset is very inconvenient.

SUMMARY

Embodiments of this application provide a wireless headset and a control box used for a wireless headset, to improve charging convenience of the wireless headset.

According to a first aspect, an embodiment of this application provides a control box used for a wireless headset. The wireless headset may be a neckband wireless headset. The control box includes a female connector part and a male connector part detachably connected to the female connector part. The male connector part includes a male connector. The female connector part includes a female socket. An end that is of the male connector part and that is away from the female connector part is connected to a connection wire of the wireless headset. The male connector of the male connector part may be electrically connected to a battery of the wireless headset through the foregoing connection wire. Alternatively, a battery is disposed in the male connector part, and the male connector of the male connector part is electrically connected to the battery. An end that is of the female connector part and that is away from the male connector part is connected to another connection wire of the wireless headset.

When the male connector part is connected to the female connector part, the male connector of the male connector part is plugged into the female socket of the female connector part, and the male connector part is electrically connected to the female connector part. An electrical signal may be transmitted to implement data signal transmission and power supply, so as to satisfy a use requirement of the wireless headset. When the male connector part is detached from the female connector part, the male connector of the male connector part may be plugged into a power supply device, to charge the battery of the wireless headset. The power supply device may be a terminal device such as a mobile phone, a tablet, a computer, a wearable device, a radio, or a music player, or may be a power supply such as a mobile power pack.

In this embodiment, the control box can directly charge the wireless headset by using the male connector part without using an additional data cable or another adapter, so that charging of the wireless headset is convenient.

In an optional embodiment, when the male connector part is detached from the female connector part, the male connector of the male connector part may be alternatively configured to plug into a paired device. The paired device may be a terminal device such as a mobile phone, a tablet, a computer, a wearable device, a radio, or a music player. In this case, the control box is electrically connected to the paired device through the male connector.

In an embodiment, when the male connector of the male connector part is plugged into the paired device, the paired device may switch a wireless connection mode between the paired device and the wireless headset to a wired connection mode, and directly transmit a data signal to the wireless headset through the male connector of the male connector part. In this case, the wireless headset may be used as a wired headset.

In another embodiment, when the male connector of the male connector part is plugged into the paired device, the paired device may determine whether wireless pairing (for example, Bluetooth pairing) has been performed between the wireless headset and the paired device. If no wireless pairing is performed, pairing between the wireless headset and the paired device is triggered, so that when a user subsequently wants to use the wireless headset to perform wireless communication with the paired device, wireless connection and wireless communication may be directly performed based on a fact that pairing has been performed, instead of performing wireless pairing when the user requires wireless communication.

When the paired device has a power supply function, the paired device may further charge the wireless headset by using the male connector of the male connector part. When the paired device has no power supply function and is used as only an audio source device, the paired device does not charge the wireless headset.

In an optional embodiment, the male connector part includes a support, a male connector sleeve, and the male connector.

The support is in a shape of a hollow cylinder. To be specific, there is a through hole inside the support, and the through hole penetrates from one end of the support to the other end of the support. In this application, an extension direction of the through hole is an extension direction of the support. In other words, a direction from one end of the support to the other end of the support is the extension direction of the support.

The male connector sleeve includes a fixed part and an extended part connected to one end of the fixed part. The fixed part and the extended part may be integrally formed. The male connector sleeve is in a shape of a hollow cylinder. The male connector sleeve is installed at one end of the support. The fixed part is housed in the support, and the extended part is outside the support. Optionally, the fixed part and the extended part are arranged in the extension direction of the support.

The male connector includes a plug end and a fixed end connected to one end of the plug end. The plug end is outside the support. The fixed end is fastened to the inside of the fixed part after passing through the extended part. In this case, the fixed end is also fastened relative to the extended part. The fixed end is fastened to the inside of the male connector sleeve. The fixed end and the male connector sleeve may be fastened to each other through interference fit. Optionally, the fixed end and the plug end are arranged in the extension direction of the support.

When the male connector part is connected to the female connector part, the plug end is housed in the female connector part. When the male connector part is detached from the female connector part, the plug end is configured to plug into the power supply device.

In this embodiment, when the male connector part is detached from the female connector part, the plug end of the male connector can be plugged into the power supply device, and the power supply device can directly charge the wireless headset by using the male connector without using an additional connection wire. Therefore, the control box improves charging convenience of the wireless headset.

The fixed end of the male connector is fastened to the inside of the fixed part of the male connector sleeve, and the fixed part is housed in the support. Therefore, the fixed part and the support fasten and protect the fixed end in a form of a double-layer sleeve. This can reduce a risk of damage such as bending of the male connector due to external force, so that strength reliability of the male connector is high. The male connector is applicable to a use environment of frequent plugging and unplugging, and has a relatively long service life.

The fixed part of the male connector sleeve is inside the support and the extended part is outside the support. In other words, a part of the male connector sleeve is inside the support and a part of the male connector sleeve is outside the support. The fixed end is inside the male connector sleeve. Therefore, when the plug end is inclined or slightly bent relative to the support, the male connector sleeve can bear a press stress or a tensile stress between an end part of the support and the male connector, so that a risk of damage to the male connector is reduced, and the strength reliability of the male connector is further ensured.

Flexural strength of the male connector sleeve may be greater than or equal to 90 MPa. In this case, the male connector sleeve has sufficient flexural strength to better protect the male connector.

In an embodiment, the male connector sleeve may use a polyformaldehyde material. A basic thickness of the male connector sleeve may be in a range from 0.6 millimeter to 0.8 millimeter. For example, the basic thickness of the male connector sleeve may be 0.65 millimeter. In this application, a range "A to B" includes an endpoint "A" and an endpoint "B".

In another embodiment, the male connector sleeve may alternatively use a polycarbonate material, a polybutylene terephthalate material, a polybutylene terephthalate material with glass fiber, a copolymer and mixture of polycarbonate and acrylonitrile butadiene styrene, a polyamide material with 15% glass fiber, or a polyamide material with 30% glass fiber. In this case, the basic thickness of the male connector sleeve may be in the range from 0.6 millimeter to 0.8 millimeter.

In another embodiment, the male connector sleeve may alternatively be an aluminum alloy die casting, a zinc alloy die casting, or a metal-insulator-metal die casting. In this case, the basic thickness of the male connector sleeve is in a range from 0.5 millimeter to 0.8 millimeter.

Flexural strength of the support may be greater than or equal to 90 MPa. In this case, the support has sufficient flexural strength. Therefore, the support can better cooperate with the male connector sleeve, to better protect the male connector, so that the strength reliability of the male connector is higher.

In an optional embodiment, the support has a first outer diameter in a first direction. The support has a second outer diameter in a second direction. The first direction is perpendicular to an extension direction of the support. The extension direction of the support is a direction from one end of the support to the other end of the support. The second direction is perpendicular to the first direction and the extension direction of the support. Both the first outer diameter and the second outer diameter are sizes of a cross-sectional shape of the support. A ratio of the second outer diameter to the first outer diameter is in a range from 1.5 to 2.5. In this case, the support is in a flattened shape.

In this embodiment, because the support is in the flattened shape, and the support is a main framework of the male connector part and determines a body shape of the male connector part, the male connector part is also roughly in a flattened shape. The flattened male connector part has relatively high structural strength, and the flattened shape also facilitates holding and operating of the user.

In an optional embodiment, the male connector may be a universal serial bus Type-C connector, a micro universal serial bus connector, or a lightning connector. A type of the female socket of the female connector part corresponds to a type of the male connector. In this case, both the male connector and the female socket are relatively universal connectors. This helps enlarge an application scope of the control box and the wireless headset.

In an optional embodiment, the male connector part further includes a first adhesive layer. The first adhesive layer is located between the male connector and the male connector sleeve. The male connector adheres to the male connector sleeve by using first adhesive layer. The first adhesive layer can increase connection firmness between the male connector and the male connector sleeve, so as to increase overall strength of the male connector part. The first adhesive layer can also seal a gap between the male connector and the male connector sleeve. In this way, waterproofing and dustproofing are implemented, so that a service life of the male connector part is longer.

The first adhesive layer may be formed in an adhesive dispensing manner, or may be an adhesive film or an adhesive sheet such as double-sided tape.

The first adhesive layer may be disposed around the male connector in a circumferential direction of the male connector, so that a connection between the male connector and the male connector sleeve is firmer and more reliable. The circumferential direction of the male connector is disposed around an extension direction of the male connector.

In an optional embodiment, the male connector part further includes a second adhesive layer. The second adhesive layer is located between the male connector sleeve and the support. The male connector sleeve adheres to the support by using the second adhesive layer. The second adhesive layer can increase connection firmness between the male connector sleeve and the support, so as to increase overall strength of the male connector part. The second adhesive layer can also seal a gap between the male connector sleeve and the support. In this way, waterproofing and dustproofing are implemented, so that a service life of the male connector part is longer.

The second adhesive layer may be formed in an adhesive dispensing manner, or may be an adhesive film or an adhesive sheet such as double-sided tape.

The second adhesive layer may be disposed around the fixed part of the male connector sleeve in a circumferential direction of the male connector sleeve. The circumferential direction of the male connector sleeve is disposed around an extension direction of the male connector sleeve.

In an optional embodiment, the support includes a support body and a support cover. The support body includes two end parts and a middle part between the two end parts. The two end parts of the support body form two ends of the support. One end part of the support body is disposed around the fixed part. The two end parts of the support body each have a complete cylindrical structure. A notch is disposed at the middle part of the support body. The notch connects the inside and the outside of the support body. The support cover covers the notch. Flexural strength of the support body is greater than or equal to flexural strength of the support cover.

In this embodiment, the flexural strength of the support body is relatively high, and the end part of the support body is disposed around the fixed part of the male connector sleeve. Therefore, flexural strength of a part that is of the support and that is used to fasten and protect the male connector sleeve and the male connector is high, so that structural reliability of the male connector is higher.

The notch is disposed on the support body. Therefore, some other components of the male connector part may be quickly and conveniently installed inside the support body through the notch, so that the components are housed in the support. The support body of the support is configured to bear main force (for example, bending force or pressing force) acting on the support, and the support cover is configured to cover the notch, to assist in protecting a component inside the support body. Therefore, the flexural strength of the support cover may be less than or equal to the flexural strength of the support body, to reduce costs of the support while ensuring that the support satisfies a basic strength requirement. In another embodiment, the flexural strength of the support cover may alternatively be greater than the flexural strength of the support body.

In an embodiment, the support body may use a polyformaldehyde material. A basic thickness of the support body may be in a range from 0.6 millimeter to 0.8 millimeter. For example, the basic thickness of the support body may be 0.65 millimeter.

In another embodiment, the support body may alternatively use a polycarbonate material, a polybutylene terephthalate material, a polybutylene terephthalate material with glass fiber, a copolymer and mixture of polycarbonate and acrylonitrile butadiene styrene, a polyamide material with 15% glass fiber, or a polyamide material with 30% glass fiber. In this case, the basic thickness of the support body may be in the range from 0.6 millimeter to 0.8 millimeter.

In another embodiment, the support body may alternatively be an aluminum alloy die casting, a zinc alloy die casting, or a metal-insulator-metal die casting. In this case, the basic thickness of the support body is in a range from 0.5 millimeter to 0.8 millimeter.

In an optional embodiment, the male connector part further includes a cable sleeve. The cable sleeve is in a shape of a hollow cylinder. The cable sleeve is installed at an end that is of the support and that is away from the male connector sleeve. A part of the cable sleeve is housed in the support, and a part of the cable sleeve is outside the support. An end part that is of the support body and that is away from the male connector sleeve is disposed around a part of the cable sleeve. A connection wire of the wireless headset may extend into the support after passing through the cable sleeve, to connect to a component inside the support.

In an optional embodiment, the male connector part further includes a protective cover. The protective cover is installed outside the support and covers the support cover. The protective cover is connected to the support body. Flexural strength of the protective cover is greater than or equal to the flexural strength of the support cover.

In this embodiment, the flexural strength of the protective cover is relatively high, and the protective cover covers the outside of the support. Therefore, the protective cover and the support can be used together to increase overall structural strength of the male connector part. This helps better protect the male connector and a component inside the support. The protective cover covers the support cover, and the flexural strength of the protective cover is greater than or equal to the flexural strength of the support cover. Therefore, the protective cover can protect a relatively weak part on the support, so that overall structural strength reliability of the male connector part is higher.

The flexural strength of the protective cover may be greater than or equal to the flexural strength of the support body. In an embodiment, the protective cover is made of aluminum. For example, the protective cover is an extruded aluminum profile. A basic thickness of the protective cover is in a range from 0.5 millimeter to 0.7 millimeter. For example, the basic thickness of the protective cover is 0.5 millimeter. In another embodiment, the protective cover may alternatively be an aluminum alloy die casting, a zinc alloy die casting, or a metal-insulator-metal die casting.

In an optional embodiment, one end part of the protective cover is disposed partially around the fixed part. In this case, the end part of the protective cover, the end part of the support, and the fixed part of the male connector sleeve jointly form a three-layer sleeve structure, and overall flexural strength of the three-layer sleeve structure is very high. In this way, a risk of damage such as bending caused by external force on the male connector protected by the three-layer sleeve structure is very low, strength reliability of the male connector is high, and a service life of the control box is longer.

In an optional embodiment, the male connector part further includes a protective cover. The protective cover is installed outside the support, and extends from one end of the support to the other end of the support. Flexural strength of the protective cover is greater than or equal to the flexural strength of the support.

In this embodiment, the protective cover covering the support can improve flexural performance of the support, so that overall flexural strength of the male connector part is higher, and the male connector and components inside the support can achieve better structural protection. In another embodiment, the flexural strength of the protective cover may alternatively be slightly less than the flexural strength of the support.

One end part of the protective cover is outside one end of the support, and the other end part of the protective cover is outside the other end of the support. Two ends of the support are partially surrounded by the corresponding end parts of the protective cover. Therefore, the end part of the protective cover, the end part of the support, and the fixed part of the male connector sleeve jointly form a three-layer sleeve structure, and overall flexural strength of the three-layer sleeve structure is very high. In this way, a risk of damage such as bending caused by external force on the male connector protected by the three-layer sleeve structure is very low, strength reliability of the male connector is high, and a service life of the control box is longer.

In an embodiment, the protective cover is made of aluminum. For example, the protective cover is an extruded aluminum profile. A basic thickness of the protective cover is in a range from 0.5 millimeter to 0.7 millimeter. For example, the basic thickness of the protective cover is 0.5 millimeter. In another embodiment, the protective cover may alternatively be an aluminum alloy die casting, a zinc alloy die casting, or a metal-insulator-metal die casting.

In an optional embodiment, a projection of an outer surface of the support on a first plane has a first length. A projection, on the first plane, of a region that is of the support and that is covered by the protective cover has a second length. A percentage of the second length to the first length is greater than or equal to 50%. The first plane is perpendicular to the extension direction of the support.

In this embodiment, the percentage of the second length to the first length is greater than or equal to 50%. Therefore, the protective cover covers half or more of the support, so that the protective cover can sufficiently protect the support, and overall structural strength of the male connector part is higher. For example, in this embodiment, the percentage of the second length to the first length may be greater than or equal to 65%.

An appearance of the protective cover varies with an appearance of the support. For example, when a cross section of the support is roughly in a shape of a flattened runway (including two oppositely arranged straight edges and opposite arc edges each connected to the two straight edges), the protective cover may be roughly in a U-shape (including one straight edge and two arc edges connected to two ends of the straight edge, where the arc edge may be shorter than the arc edge of the support) or another shape wrapping the support.

In this embodiment, a shape of the protective cover varies with the appearance of the support, so that the protective cover can better fit the support, and overall structural strength of the male connector part is higher. In addition, an overall shape of the male connector part can also vary with that of the support, so that the overall male connector part is in a flattened shape. This helps increase structural strength and facilitates holding and operating of the user.

In an optional embodiment, the male connector part further includes a third adhesive layer. The third adhesive layer is located between the protective cover and the support. The protective cover adheres to the support by using the third adhesive layer. The third adhesive layer can increase connection firmness between the protective cover and the support, so as to increase overall strength of the male connector part. The third adhesive layer can also seal a gap between the protective cover and the support. In this way, waterproofing and dustproofing are implemented, so that a service life of the male connector part is longer.

In an embodiment, the protective cover, the third adhesive layer, the support, the second adhesive layer, the male connector sleeve, and the first adhesive layer jointly form an alternately combined structure including three sleeves and three adhesive layers. Flexural strength of the entire structure is very high, and the male connector can be effectively protected. Therefore, the male connector has high structural reliability, is applicable to more use environments, and has a longer service life.

The third adhesive layer may be formed in an adhesive dispensing manner, or may be an adhesive film or an adhesive sheet such as double-sided tape.

The third adhesive layer may be disposed partially around the support in a circumferential direction of the support, so that a connection between the support and the protective cover is firmer and more reliable. The circumferential direction of the support is disposed around the extension direction of the support.

In an optional embodiment, the male connector part further includes a button board. The button board is installed outside the support. The button board and the protective cover are staggered from each other. The button board and the protective cover are separately installed on two sides of the support. The button board includes a plurality of buttons. The plurality of buttons correspond to a plurality of trigger parts on the circuit board. When being pressed, the plurality of buttons abut against the plurality of trigger parts to trigger the trigger parts, so that the wireless headset performs corresponding operations.

An appearance of the button board varies with the appearance of the support. For example, when a cross section of the support is roughly in a shape of a flattened runway (including two oppositely arranged straight edges and opposite arc edges each connected to the two straight edges), the button board may be roughly in a U-shape (including one straight edge and two arc edges connected to two ends of the straight edge, where the arc edge may be shorter than the arc edge of the support) or another shape wrapping the support.

In this embodiment, a shape of the button board varies with the appearance of the support, so that the button board can better fit the support, overall structural strength of the male connector part is higher, and the trigger parts can be more smoothly triggered by using the buttons on the button board. In addition, an overall shape of the male connector part can also vary with that of the support, so that the overall male connector part is in a flattened shape. This helps increase structural strength and facilitates holding and operating of the user.

In an optional embodiment, the male connector part further includes the circuit board and a control module located on the circuit board. The circuit board and the control module are housed in the support. The control module may include at least one processor, at least one memory, a wireless communications module, an audio management module, a power management module, and the like. The processor may include one or more interfaces, configured to connect to another module in the control module.

The at least one memory is configured to store program code, the at least one processor is configured to execute the application program code, the wireless communications module is configured to support data exchange in wireless communication between the control box and the paired device, the audio management module is configured to manage audio data, and the power management module is configured to receive charging input or output power by using the male connector. Details are as follows:

The at least one memory may be configured to store the program code, for example, program code used to charge the wireless headset and application program code used to perform wireless pairing connection with the paired device. The at least one memory may further store a Bluetooth address used to uniquely identify the wireless headset. In addition, the at least one memory may further store a pairing history of a paired device that has been successfully paired with the wireless headset before. Based on the pairing history, the wireless headset can automatically establish a connection to the paired device that has been paired with the wireless headset. The Bluetooth address may be a media access control (media access control, MAC) address.

The at least one processor may be configured to execute the application program code, and invoke related modules such as the audio management module and the power management module, to implement a function of the wireless headset in this embodiment of this application, for example, to implement a charging function and an audio data playing function of the wireless headset.

The wireless communications module may be configured to support data exchange in wireless communication between the control box of the wireless headset and the paired device. The wireless communication includes a wireless local area network (wireless local area networks, WLAN) (such as a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and infrared (infrared, IR). In some embodiments, the wireless communications module may be a first wireless chip, for example, a first Bluetooth chip. The wireless headset may perform pairing with and establish a wireless connection to a Bluetooth chip of the paired device through the first Bluetooth chip, to implement short-distance data exchange between the wireless headset and the paired device through the wireless connection.

The audio management module may be configured to manage audio data and control an earpiece part (for example, a first earpiece and a second earpiece in the following specification) of the wireless headset to play an audio signal (for example, play a dual-channel signal or a mono signal). In some embodiments, the audio management module may obtain an audio signal from the wireless communications module or the male connector of the male connector part, or transfer an audio signal to the wireless communications module or the male connector of the male connector part, to implement a function such as answering/making a call, playing music, enabling/disabling a voice assistant of the paired device connected to the headset, or receiving/sending voice data of a user by using the wireless headset.

The power management module may be configured to receive charging input or output power by using the male connector of the male connector part. In other words, the power management module may be configured to support the wireless headset in receiving charging input, or charging another electronic device. For example, when the male connector of the male connector part is connected to or directly plugged into a power supply device, the power management module receives charging input by using the male connector of the male connector part. In some embodiments of wireless charging, the power management module may receive wireless charging input by using a wireless charging coil. When receiving the charging input to charge the battery of the wireless headset, the power management module may further supply power for normal working of the wireless headset.

The power management module may be further configured to supply power to modules such as the at least one processor, the at least one memory, and the wireless communications module. The power management module may be further configured to monitor parameters such as a battery capacity, a battery cycle count, and a battery health status (electric leakage or impedance). In some other embodiments, the power management module may alternatively be disposed in the processor.

In an optional embodiment, a plurality of trigger parts are further disposed on the circuit board. The plurality of trigger parts are electrically connected to the control module. Each trigger part is configured to respond to a trigger action, so that the wireless headset performs a corresponding operation, for example, increasing volume, decreasing volume, playing a previous song, playing a next song, answering an incoming call, hanging up an incoming call, charging, or ending charging.

In an optional embodiment, the male connector part may further include a microphone. The microphone is housed in the support. The microphone may also be referred to as a "mike" or a "microphone", and is configured to convert a sound signal into an audio electrical signal. For example, when the wireless headset is used as an audio input device of the paired device, in a process in which the user talks (for example, makes a call or sends a voice message), the microphone may collect a sound signal of the user, to control the wireless headset to perform a corresponding operation, or convert the sound signal into an audio signal, and send the audio signal to the paired device.

A first through hole is disposed on the support, and a second through hole is disposed on the protective cover. The sound signal can enter the support through the second through hole and the first through hole, so that the sound signal is received by the microphone.

In an optional embodiment, the male connector part may further include an antenna. The wireless communications module receives an electromagnetic wave through the antenna, performs frequency modulation and filtering processing on an electromagnetic wave signal, and sends a processed signal to the at least one processor. The wireless communications module may further receive a to-be-sent signal from the at least one processor, perform frequency modulation and amplification on the signal, and convert the signal into an electromagnetic wave for radiation through the antenna.

In an optional embodiment, the female connector part includes a female connector sleeve and the female socket housed in the female connector sleeve. When the male connector part is connected to the female connector part, a part or all of the extended part is housed in the female connector sleeve, and the plug end is housed in the female connector sleeve and is connected to the female socket. When the male connector is connected to the female socket, an electrical signal may be transmitted between the male connector and the female socket.

In this embodiment, the female connector sleeve can protect the female socket. When the male connector part is connected to the female connector part, the female connector part protects the male connector and the extended part of the male connector sleeve.

The female connector sleeve may use a polyformaldehyde material, a polycarbonate material, a polybutylene terephthalate material, a polybutylene terephthalate material with glass fiber, a copolymer and mixture of polycarbonate and acrylonitrile butadiene styrene, a polyamide material with 15% glass fiber, a polyamide material with 30% glass fiber, an aluminum alloy die casting, a zinc alloy die casting, or a metal-insulator-metal die casting. In an embodiment, a material of the female connector sleeve may be the same as a material of the male connector sleeve, to reduce a quantity of material types of the control box and reduce costs of the wire control box. In addition, appearance consistency between the female connector sleeve and the male connector sleeve is high. This also helps improve user experience of the wire control box.

A shape of the female connector sleeve varies with an appearance of the male connector part. For example, if the male connector part is roughly in a flattened shape, the female connector sleeve is also roughly in a flattened shape. The female connector sleeve has a third outer diameter in a third direction and has a fourth outer diameter in a fourth direction. A ratio of the fourth outer diameter to the third outer diameter is in a range from 1.5 to 2.5. The third direction is perpendicular to an extension direction of the female connector sleeve. The fourth direction is perpendicular to the third direction and the extension direction of the female connector sleeve. In this case, the entire control box is in a flattened shape, overall structure strength is relatively high, and appearance consistency is high. This facilitates holding and operating of the user.

In an optional embodiment, the control box further includes one or more waterproof rings. The one or more waterproof rings are circularly disposed outside the male connector part and/or inside the female connector part, to seal a gap between the female connector part and the male connector part when the male connector part is connected to the female connector part.

Because the male connector part and the female connector part of the control box are in a detachable connection relationship, a waterproof structure needs to be disposed between the male connector part and the female connector part, to ensure reliability of the wire control box. In this embodiment, the one or more waterproof rings are disposed, so that when the male connector part is connected to the female connector part, the gap between the male connector part and the female connector part is sealed. Therefore, external water vapor or dust is prevented from entering the control box through the gap between the male connector part and the female connector part. In this way, waterproofing and dustproofing effects of the control box are very good. Because the one or more waterproof rings are circularly disposed outside the male connector part and/or inside the female connector part, the one or more waterproof rings can continuously seal the gap between the male connector part and the female connector part in a circumferential direction of the wire control box, so that waterproofing and dustproofing performance of the control box is more reliable.

In an optional embodiment, the control box further includes a first waterproof ring. The first waterproof ring is circularly fastened to an outer sidewall of the extended part. The first waterproof ring is outside the support. When the male connector part is connected to the female connector part, the first waterproof ring is tightly pressed between the extended part and the female connector sleeve.

In this embodiment, the first waterproof ring is sleeved on the outside of the extended part of the male connector sleeve, so that the gap between the male connector part and the female connector part can be sealed when the male connector part is connected to the female connector part, and the first waterproof ring does not affect plugging and unplugging of the male connector when the male connector part is detached from the female connector part and is plugged into another device. This helps improve use experience of the wireless headset.

In an optional embodiment, the first waterproof ring includes a sealing ring body and a plurality of position-limiting blocks. The sealing ring body is a continuous closed-loop ring body. The sealing ring body is configured to seal the gap between the male connector part and the female connector part when the male connector part is connected to the female connector part. The plurality of position-limiting blocks are located on an inner side surface of the sealing ring body at intervals. To be specific, a gap is formed between two adjacent position-limiting blocks. The sealing ring body and the plurality of position-limiting blocks may be integrally formed.

A concave groove and a plurality of position-limiting grooves are disposed on the outer sidewall of the extended part. The concave groove is a circular groove. The plurality of position-limiting grooves are located inside the concave groove at intervals and are connected to the concave groove. A part of the sealing ring body is housed in the concave groove, and the plurality of position-limiting blocks are housed in the plurality of position-limiting grooves in a one-to-one correspondence.

In this embodiment, the first waterproof ring includes the plurality of position-limiting blocks connected to the sealing ring body, the plurality of position-limiting grooves connected to the concave groove are disposed at the extended part, and the plurality of position-limiting blocks are housed in the plurality of position-limiting grooves in a one-to-one correspondence. Therefore, the sealing ring body can be more firmly installed in the concave groove, and a risk that the first waterproof ring is detached from the extended part is very small, to ensure waterproofing reliability of the wire control box, so that the control box has higher reliability and a longer service life.

In an optional embodiment, the control box further includes a second waterproof ring. The female connector part further includes a fastening ring housed in the female connector sleeve. The second waterproof ring is fastened to an inner sidewall of the fastening ring. When the male connector part is connected to the female connector part, the male connector is plugged into the female socket after passing through the second waterproof ring. The second waterproof ring is tightly pressed between the fastening ring and the male connector.

In this embodiment, when the male connector part is connected to the female connector part, the second waterproof ring is tightly pressed between the fastening ring and the male connector. Therefore, the gap between the male connector part and the female connector part can be sealed, so that the control box has better waterproofing performance.

The fastening ring is connected to the female connector sleeve by using an adhesive layer. The adhesive layer can improve waterproofing performance of the female connector part, so that the control box has better waterproofing performance.

In an optional embodiment, the fastening ring has a first sidewall facing the female socket. A circular slot is disposed on the inner sidewall of the fastening ring, and the circular slot extends to the first sidewall. Slot walls of the circular slot include a slot bottom wall and a slot sidewall, and the slot bottom wall of the circular slot is connected to and is between the slot sidewall of the circular slot and the first sidewall. A part of the second waterproof ring is housed in the circular slot. The female socket has a housing. The female socket further includes a connection terminal housed in the housing, and the connection terminal is configured to connect to a terminal of the male connector. A circular flange is formed at an end that is of the housing and that faces the fastening ring, and a part or all of the circular flange faces the second waterproof ring.

In this embodiment, a slot sidewall of the circular slot can prevent the second waterproof ring from moving away from the female socket, and the circular flange of the housing of the female socket can prevent the second waterproof ring from moving close to the female socket. Therefore, the slot sidewall of the circular slot and the circular flange of the housing of the female socket can jointly limit a position of the second waterproof ring, to avoid a case in which the second waterproof ring has relatively large displacement and is detached from the fastening ring when the second waterproof ring is subject to force (for example, friction force existing during plugging and unplugging of the male connector part). In this way, the second waterproof ring can be firmly fastened to the inside of the fastening ring, so that waterproofing performance of the control box is reliable.

In an optional embodiment, the second waterproof ring includes a positioning part and a sealing part. The positioning part is fastened to the circular slot. The sealing part is circularly located on an inner side surface of the positioning part. A width of the positioning part is greater than twice a width of the sealing part. The width of the positioning part is a size of the positioning part in the extension direction of the female connector sleeve. The width of the sealing part is a size of the sealing part in the extension direction of the female connector sleeve.

In this embodiment, the sealing part mainly provides sealing and waterproofing functions, and the positioning part is configured to fasten the sealing part to the fastening ring. When the male connector is plugged into the female socket or unplugged from the female socket, friction force between the male connector and the sealing part needs to be overcome. Therefore, the width of the sealing part is relatively small, to ensure that the male connector can be smoothly plugged and unplugged. If the width of the positioning part is greater than twice the width of the sealing part, a fastening area between the second waterproof ring and the fastening ring is relatively large, and the second waterproof ring can be more firmly fastened to the fastening ring.

In an optional embodiment, the second waterproof ring further includes a plurality of reinforcing parts. The plurality of reinforcing parts are located on an outer side surface of the positioning part at intervals. The fastening ring further has a plurality of reinforcing grooves connected to the circular slot. The plurality of reinforcing grooves are disposed at intervals from each other and all extend to the first sidewall. The plurality of reinforcing parts are housed in the plurality of reinforcing grooves in a one-to-one correspondence.

In this embodiment, the second waterproof ring includes the plurality of reinforcing parts that are located on the outer side surface of the positioning part at intervals, and the plurality of reinforcing parts are housed in the plurality of reinforcing grooves of the fastening ring in a one-to-one correspondence. The plurality of reinforcing parts enable the positioning part to be more stably housed in the circular slot. Therefore, the second waterproof ring can be more firmly fastened to the fastening ring, and a risk that the second waterproof ring is detached from the fastening ring is very small, to ensure waterproofing reliability of the wire control box, so that the control box has higher reliability and a longer service life.

According to a second aspect, an embodiment of this application further provides a wireless headset. The wireless headset includes a neckband wire, a battery case, a first connection wire, a first earpiece, a second connection wire, a second earpiece, and the control box according to any one of the foregoing embodiments. A battery is disposed in the battery case. The battery is configured to supply power to the wireless headset. The neckband wire, the first connection wire, and the second connection wire each can transmit an electrical signal. The first earpiece and the second earpiece each are configured to convert an electrical signal into a sound signal.

Two ends of the battery case are separately connected to one end of the neckband wire and one end of the first connection wire. The first earpiece is connected to the other end of the first connection wire. The male connector part of the control box is connected to the other end of the neckband wire. The male connector is electrically connected to the battery. The female connector part and the second earpiece are separately connected to two ends of the second connection wire.

In this embodiment, the neckband wire is connected to and is between the male connector part of the control box and the battery case. Therefore, an electrical signal is transmitted between the male connector part and the battery case through the neckband wire. When the male connector part is connected to the female connector part, the wireless headset may play a sound by using the first earpiece and the second earpiece, to satisfy a use requirement of a user. When the male connector part is detached from the female connector part, the male connector part may be plugged into a power supply device, to charge the battery. Therefore, the control box can directly charge the battery of the wireless headset by using the male connector part without using an additional data cable or another adapter, so as to improve charging convenience of the wireless headset.

The wireless headset may be a Bluetooth headset.

In an optional embodiment, the first earpiece and/or the second earpiece may further include sensors/a sensor. For example, the sensor may be a distance sensor or a proximity sensor. The wireless headset may determine, by using the sensor, whether the first earpiece and/or the second earpiece are/is worn by the user. For example, the first earpiece and/or the second earpiece may detect, by using the proximity sensor, whether there is an object near the first earpiece and/or the second earpiece, so as to determine whether the first earpiece and/or the second earpiece are/is worn by the user. When it is determined that the first earpiece and/or the second earpiece are/is worn, the first earpiece and/or the second earpiece may enable a microphone. In some embodiments, the first earpiece and/or the second earpiece may further include a bone conduction sensor, to form a bone conduction headset. By using the bone conduction sensor, the first earpiece and/or the second earpiece may obtain a vibration signal of a vibration bone of a voice part, and obtain a speech signal through parsing, to implement a speech function.

According to a third aspect, an embodiment of this application further provides a wireless headset. The wireless headset includes a neckband wire, a first earpiece, a second connection wire, a second earpiece, and the control box according to any one of the foregoing embodiments. A battery is disposed in a male connector part of the wire control box. The male connector is electrically connected to the battery. Two ends of the neckband wire are separately connected to the male connector part and the first earpiece. Two ends of the second connection wire are separately connected to the female connector part and the second earpiece.

In this embodiment, when the male connector part is connected to the female connector part, the wireless headset may play a sound by using the first earpiece and the second earpiece, to satisfy a use requirement of a user. When the male connector part is detached from the female connector part, the male connector part may be plugged into a power supply device, to charge the battery. Therefore, the control box can directly charge the battery of the wireless headset by using the male connector part without using an additional data cable or another adapter, so as to improve charging convenience of the wireless headset.

DESCRIPTION OF EMBODIMENTS

The following describes implementations of this application with reference to the accompanying drawings in the embodiments of this application.

Figure 1A:
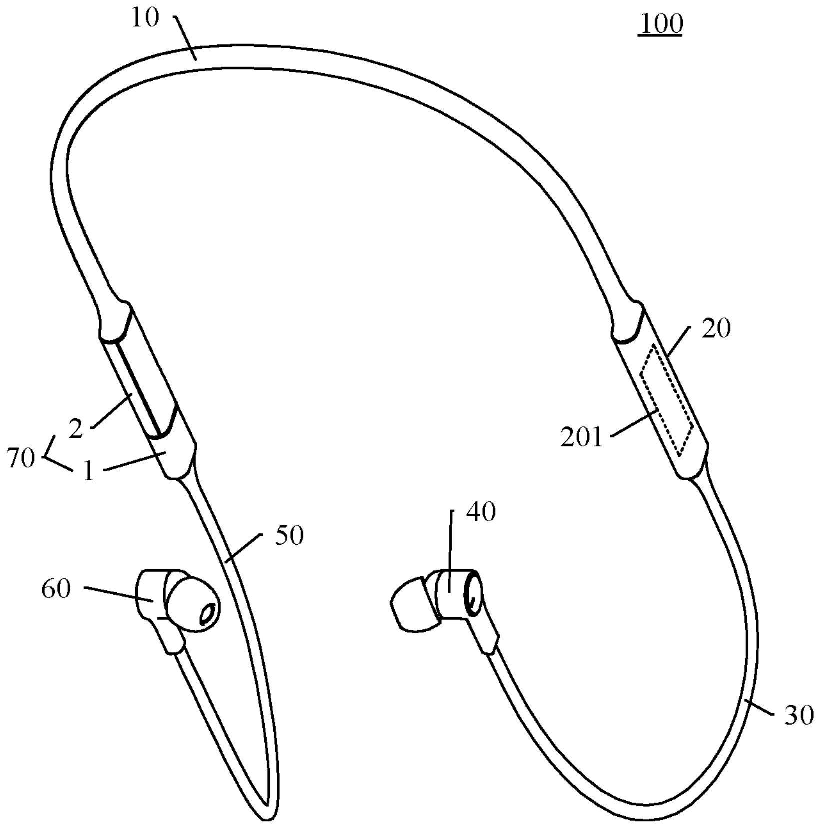
FIG. 1A is a schematic structural diagram of a wireless headset in a use state according to an embodiment of this application.
Figure 1B:
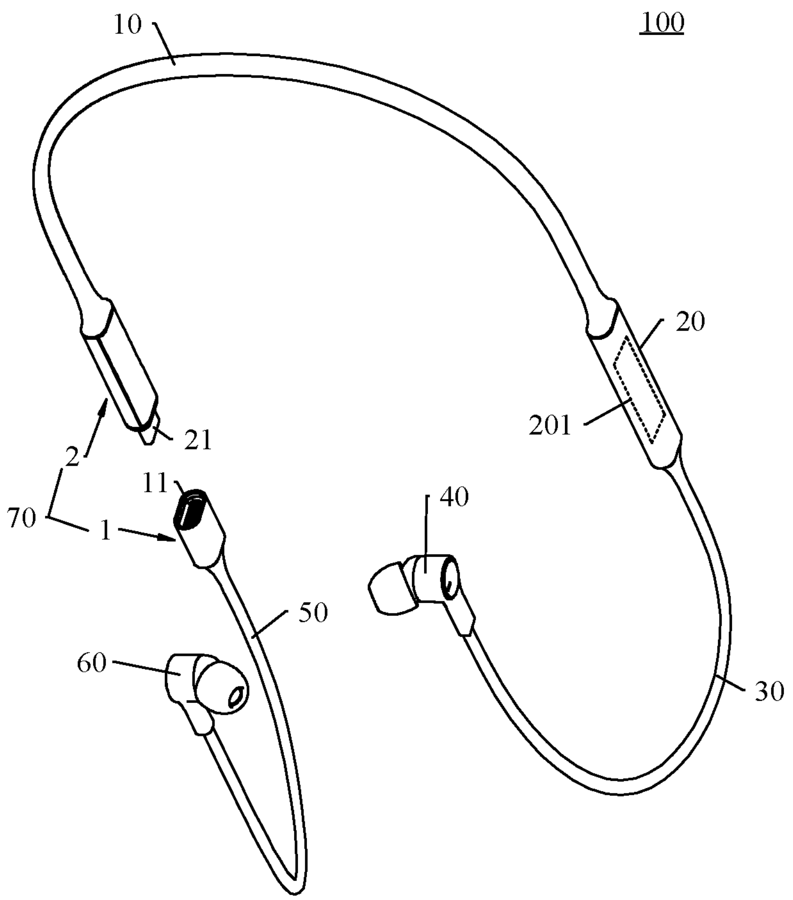
FIG. 1B is a schematic structural diagram of the wireless headset that is shown in FIG. 1A and that is in another use state.

FIG. 1A is a schematic structural diagram of a wireless headset 100 in a use state according to an embodiment of this application. FIG. 1B is a schematic structural diagram of the wireless headset 100 that is shown in FIG. 1A and that is in another use state. The wireless headset 100 may be a neckband wireless headset.

The wireless headset 100 includes a neckband wire 10, a battery case 20, a first connection wire 30, a first earpiece 40, a second connection wire 50, a second earpiece 60, and a control box 70. A battery 201 is disposed in the battery case 20. The battery 201 is configured to supply power to the wireless headset 100. The neckband wire 10, the first connection wire 30, and the second connection wire 50 each can transmit an electrical signal. The first earpiece 40 and the second earpiece 60 each are configured to convert an electrical signal into a sound signal. The control box 70 includes a female connector part 1 and a male connector part 2 detachably connected to the female connector part 1. When the male connector part 2 is detached from the female connector part 1, a male connector 21 of the male connector part 2 is configured to plug into a power supply device. As shown in FIG. 1A, the male connector part 2 of the control box 70 is connected to the female connector part 1. As shown in FIG. 1B, the male connector part 2 of the control box 70 is detached from the female connector part 1.

Two ends of the battery case 20 are separately connected to one end of the neckband wire 10 and one end of the first connection wire 30. The first earpiece 40 is connected to the other end of the first connection wire 30. The male connector part 2 of the control box 70 is connected to the other end (an end away from the battery case 20) of the neckband wire 10. The male connector 21 of the male connector part 2 is electrically connected to the battery 201. The female connector part 1 and the second earpiece 60 are separately connected to two ends of the second connection wire 50. When the male connector 21 of the male connector part 2 is directly in contact with a female socket 11 of the female connector part 1, the male connector 21 is electrically connected to the female socket 11, that is, the male connector part 2 is electrically connected to the female connector part 1, and a data path and a power supply path are formed between the male connector part 2 and the female connector part 1. A wireless data signal received by the male connector part 2 from a paired device may be transmitted to the second earpiece 60 through the female connector part 1 and the second connection wire 50, and may also be transmitted to the first earpiece 40 through the neckband wire 10 and the first connection wire 30. The battery 201 may supply power to the control box 70, the first earpiece 40, and the second earpiece 60.

In this embodiment, the neckband wire 10 is connected to and is between the male connector part 2 of the control box 70 and the battery case 20. Therefore, an electrical signal is transmitted between the male connector part 2 and the battery case 20 through the neckband wire 10. When the male connector part 2 is connected to the female connector part 1, the male connector part 2 is electrically connected to the female connector part 1, and an electrical signal may be transmitted to implement data signal transmission and power supply. The wireless headset 100 may play a sound by using the first earpiece 40 and the second earpiece 60. When the male connector part 2 is detached from the female connector part 1, the male connector 21 of the male connector part 2 may be plugged into the power supply device, to charge the battery 201. Therefore, the control box 70 can directly charge the battery 201 of the wireless headset 100 by using the male connector part 2 without using an additional data cable or another adapter, so as to improve charging convenience of the wireless headset 100.

The power supply device may be a terminal device such as a mobile phone, a tablet, a computer, a wearable device, a radio, or a music player, or may be a power supply such as a mobile power pack.

In an optional embodiment, when the male connector part 2 is detached from the female connector part 1, the male connector 21 of the male connector part 2 may be alternatively configured to plug into the paired device. The paired device may be a terminal device such as a mobile phone, a tablet, a computer, a wearable device, a radio, or a music player. In this case, the control box 70 is electrically connected to the paired device through the male connector 21.

In an embodiment, when the male connector 21 of the male connector part 2 is plugged into the paired device, the paired device may switch a wireless connection mode between the paired device and the wireless headset to a wired connection mode, and directly transmit a data signal to the wireless headset 100 through the male connector 21 of the male connector part 2. In this case, the wireless headset 100 may be used as a wired headset.

In another embodiment, when the male connector 21 of the male connector part 2 is plugged into the paired device, the paired device may determine whether wireless pairing (for example, Bluetooth pairing) has been performed between the wireless headset 100 and the paired device. If no wireless pairing is performed, pairing between the wireless headset 100 and the paired device is triggered, so that when a user subsequently wants to use the wireless headset 100 to perform wireless communication with the paired device, wireless connection and wireless communication may be directly performed based on a fact that pairing has been performed, instead of performing wireless pairing when the user requires wireless communication.

When the paired device has a power supply function, the paired device may further charge the wireless headset 100 by using the male connector 21 of the male connector part 2. When the paired device has no power supply function and is used as only an audio source device, the paired device does not charge the wireless headset 100.

In an optional embodiment, the neckband wire 10 includes an outer insulation covering and a transmission conducting wire located inside the outer insulation covering. The transmission conducting wire may also be used in cooperation with memory metal. For example, the transmission conducting wire may be disposed in parallel with the memory metal, and the insulation covering is wrapped around the transmission conducting wire and the memory metal. The neckband wire 10 including the memory metal can keep a specific radian and is relatively comfortable to use when being hung on a neck. The first connection wire 30 and the second connection wire 50 each also include an outer insulation covering and a transmission conducting wire located inside the outer insulation covering.

Usually, for aesthetics, the control box 70 and the battery case 20 may be symmetrically distributed on two sides of the neckband wire 10, and the control box 70 and the battery case 20 are basically of a same size. Compared with a case of placing a battery and a wire control board in a control box on one side, in this embodiment of this application, when the battery 21 is separately placed in the battery case 20 that is independent of the control box 70 and is located on the other side, the wireless headset 100 may have a larger battery volume and a larger battery capacity, so that use duration of the wireless headset 100 can be increased.

In an optional embodiment, an outer surface of the control box 70, an outer surface of the first earpiece 40, or an outer surface of the second earpiece 60 may further include: a touch sensor, configured to detect a touch operation of the user; a fingerprint sensor, configured to detect a user fingerprint, identify a user identity, and the like; an ambient light sensor, configured to adaptively adjust some parameters such as volume based on brightness of perceived ambient light; and some other sensors.

In an optional embodiment, the first earpiece 40 and/or the second earpiece 60 may further include sensors/a sensor. For example, the sensor may be a distance sensor or a proximity sensor. The wireless headset 100 may determine, by using the sensor, whether the first earpiece 40 and/or the second earpiece 60 are/is worn by the user. For example, the first earpiece 40 and/or the second earpiece 60 may detect, by using the proximity sensor, whether there is an object near the first earpiece 40 and/or the second earpiece 60, so as to determine whether the first earpiece 40 and/or the second earpiece 60 are/is worn by the user. When it is determined that the first earpiece 40 and/or the second earpiece 60 are/is worn, the first earpiece 40 and/or the second earpiece 60 may enable a microphone 267. In some embodiments, the first earpiece 40 and/or the second earpiece 60 may further include a bone conduction sensor, to form a bone conduction headset. By using the bone conduction sensor, the first earpiece 40 and/or the second earpiece 60 may obtain a vibration signal of a vibration bone of a voice part, and obtain a speech signal through parsing, to implement a speech function.

It may be understood that a structure shown in this embodiment of this application does not constitute a specific limitation on the wireless headset 100. The wireless headset 100 may have more or fewer components than those shown in FIG. 1A and FIG. 1B, may combine two or more components, or may have different component arrangements. For example, components such as an indicator (which may indicate a state such as a battery level), a display (which may notify the user of related information), a dust filter (which may be used in cooperation with the earpiece), and a control may be further included on the control box 70 of the wireless headset 100, a rear side of the first earpiece 40, or a rear side of the second earpiece 60. A component such as a motor may be further included in the control box 70, the first earpiece 40, or the second earpiece 60. The control may include a physical button, a touch button (which is used in cooperation with the touch sensor), and the like, and is configured to trigger an operation such as powering on, powering off, pausing, playing, recording, charging, or ending charging.

In an optional embodiment, structures of the first earpiece 40 and the second earpiece 60 may be an earbud structure, or may be an earmuff structure.

Figure 2:
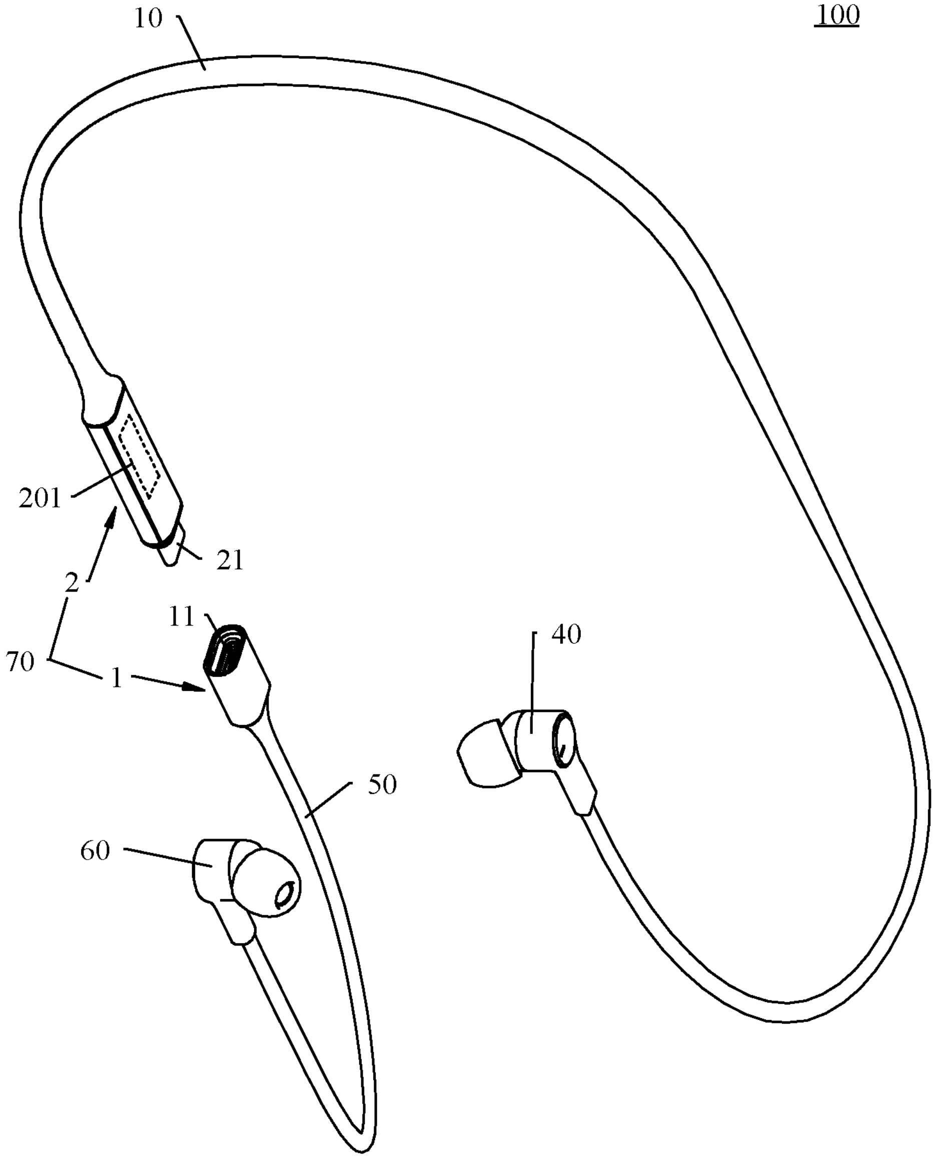
FIG. 2 is a schematic structural diagram of another wireless headset according to an embodiment of this application.

FIG. 2 is a schematic structural diagram of another wireless headset 100 according to an embodiment of this application. Most technical content of the wireless headset 100 shown in FIG. 2 is the same as that of the wireless headset 100 shown in FIG. 1A and FIG. 1B, and therefore is not described again.

In this embodiment, the battery 201 is disposed in the male connector part 2 of the control box 70 of the wireless headset 100. The male connector 21 of the male connector part 2 is electrically connected to the battery 201. Two ends of the neckband wire 10 are separately connected to the male connector part 2 and the first earpiece 40. Two ends of the second connection wire 50 are separately connected to the female connector part 1 and the second earpiece 60. No battery case or first connection wire is disposed in the wireless headset 100. In this case, the wireless headset 100 has a simpler structure and lower costs.

It may be understood that the following uses the wireless headset 100 shown in FIG. 1A and FIG. 1B as an example for further descriptions. In a case in which no conflict occurs, all these descriptions may be applied to the wireless headset 100 shown in FIG. 2.

Figure 3:
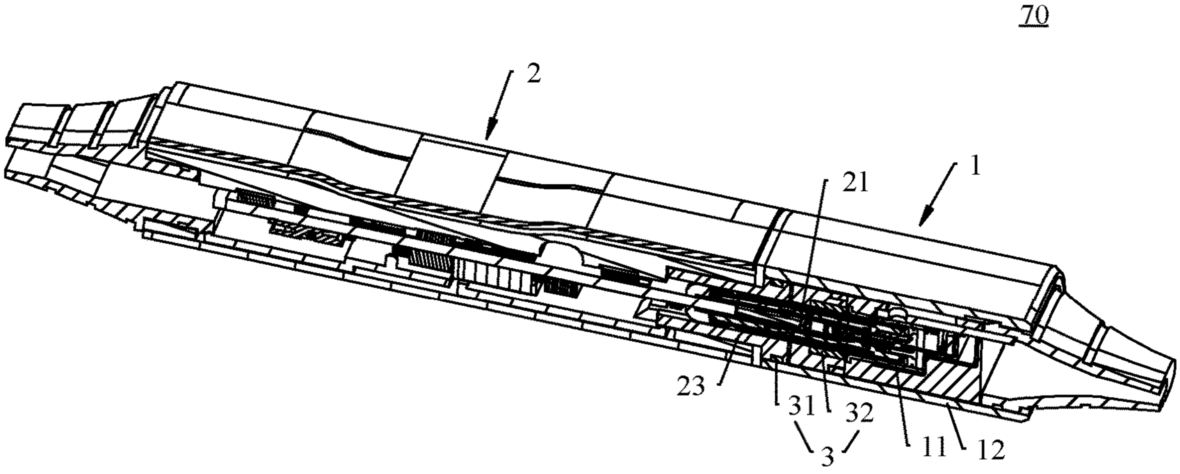
FIG. 3 is a schematic diagram of an internal structure of a control box of the wireless headset shown in FIG. 1A.

Referring to FIG. 1B and FIG. 3, FIG. 3 is a schematic diagram of an internal structure of the control box 70 of the wireless headset 100 shown in FIG. 1A. As shown in FIG. 3, the male connector part 2 of the control box 70 is connected to the female connector part 1.

The male connector 21 of the male connector part 2 protrudes from one end of the male connector part 2, and a part of the male connector 21 is plugged into the female connector part 1, to connect to the female socket 11 of the female connector part 1. An end that is of the male connector part 2 and that is away from the female connector part 1 is used to connect to a connection wire (for example, the neckband wire 10) of the wireless headset 100. An end that is of the female connector part 1 and that is away from the male connector part 2 is used to connect to a connection wire (for example, the second connection wire 50) of the wireless headset 100.

When the male connector part 2 is connected to the female connector part 1, a housing of the male connector part 2 and a housing of the female connector part 1 are roughly spliced into a cylindrical box. The male connector 21, the female socket 12, and most of other components of the control box 70 are housed in the cylindrical box, so that an overall appearance of the control box 70 is simple and components in the control box 70 can be effectively protected. In this way, a service life of the control box 70 is relatively long.

Figure 4:
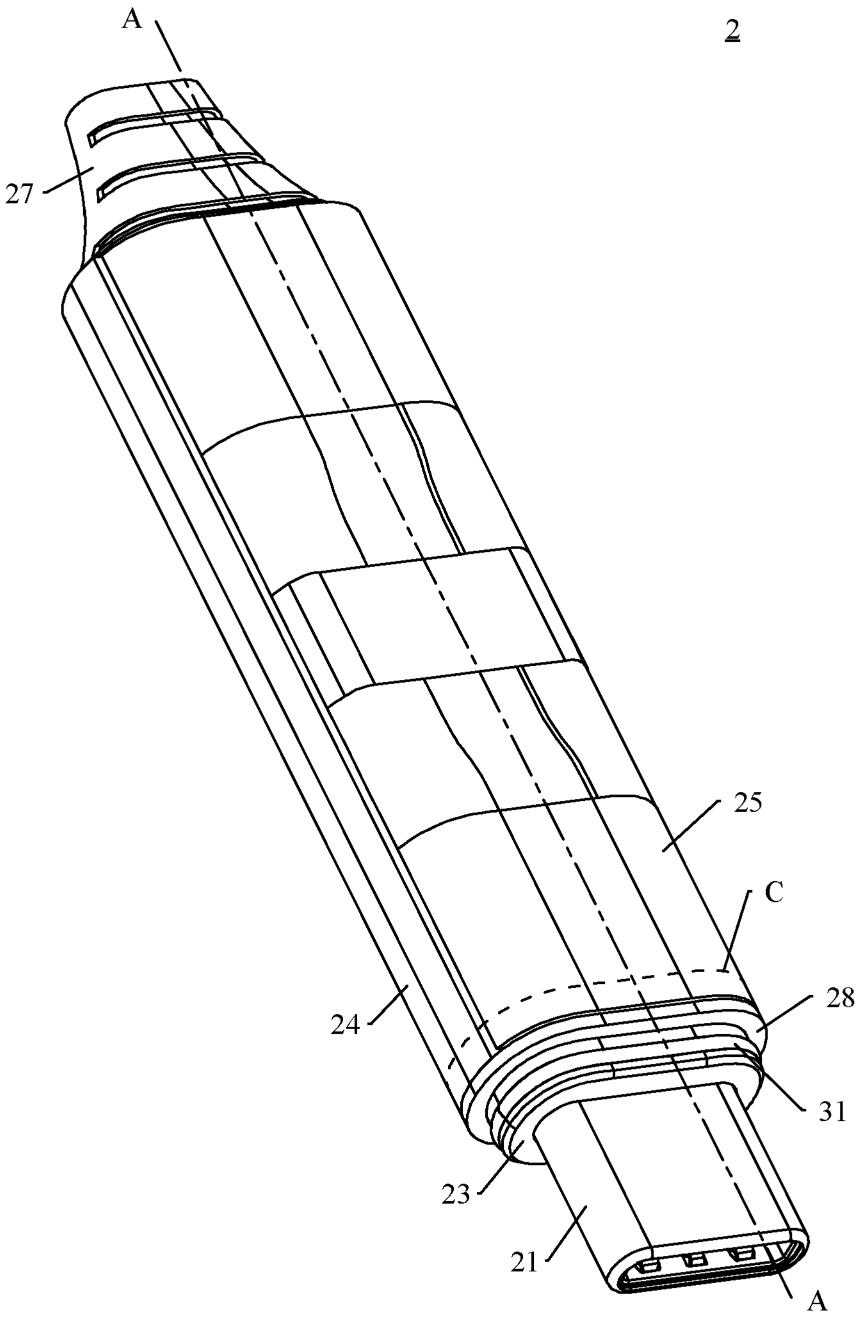
FIG. 4 is a schematic structural diagram of a male connector part of the control box shown in FIG. 3.
Figure 5:
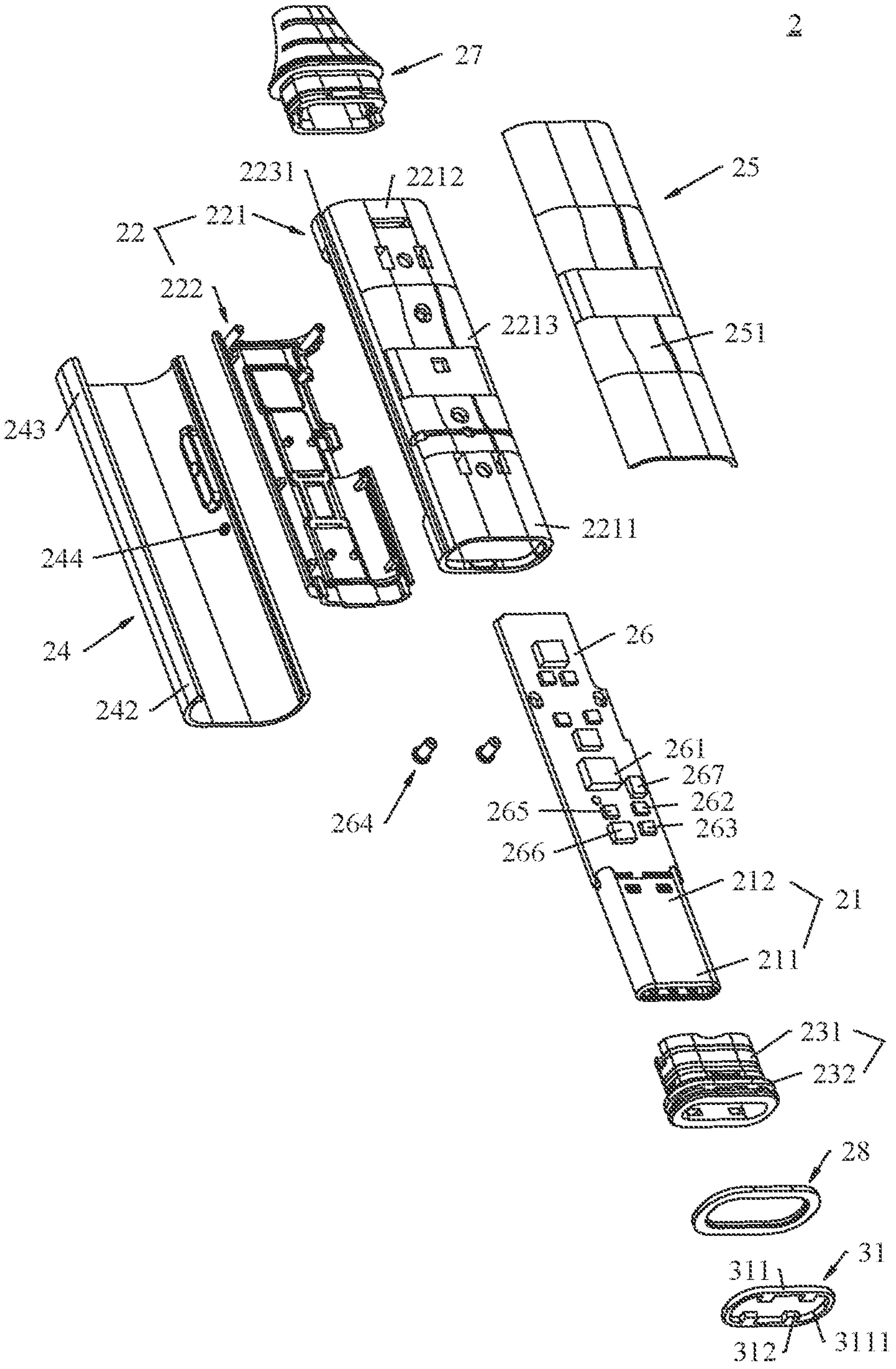
FIG. 5 is a schematic exploded view of the male connector part shown in FIG. 4.
Figure 6:
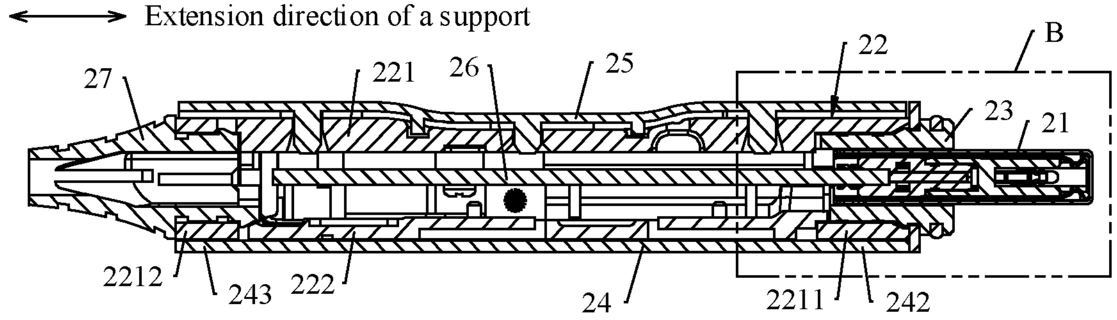
FIG. 6 is a cross-sectional view obtained after the male connector part shown in FIG. 4 is sectioned along a line A-A.

Referring to FIG. 4 to FIG. 6, FIG. 4 is a schematic structural diagram of the male connector part 2 of the control box 70 shown in FIG. 3, FIG. 5 is a schematic exploded view of the male connector part 2 shown in FIG. 4, and FIG. 6 is a cross-sectional view obtained after the male connector part 2 shown in FIG. 4 is sectioned along a line A-A.

The male connector part 2 includes a support 22, a male connector sleeve 23, the male connector 21, a protective cover 24, a button board 25, a circuit board 26, a control module on the circuit board 26, and a cable sleeve 27.

The support 22 is in a shape of a hollow cylinder. To be specific, there is a through hole inside the support 22, and the through hole penetrates from one end of the support 22 to the other end of the support 22. The through hole may be a variable-diameter hole or an equal-diameter hole. In this application, an extension direction of the through hole is an extension direction of the support 22. In other words, a direction from one end of the support 22 to the other end of the support 22 is the extension direction of the support 22. The support 22 includes a support body 221 and a support cover 222. The support cover 222 is installed on the support body 221. The support body 221 includes two ends of the support 22.

The male connector sleeve 23 is in a shape of a hollow cylinder. An inner through hole of the male connector sleeve 23 may be an equal-diameter hole. The male connector sleeve 23 is installed at one end of the support 22. A part of the male connector sleeve 23 is housed in the support 22, and a part of the male connector sleeve 23 is outside the support 22.

The cable sleeve 27 is in a shape of a hollow cylinder. An inner through hole of the cable sleeve 27 may be a variable-diameter hole. The cable sleeve 27 is installed at an end that is of the support 22 and that is away from the male connector sleeve 23. A part of the cable sleeve 27 is housed in the support 22, and a part of the cable sleeve 27 is outside the support 22. The neckband wire 10 may pass through the cable sleeve 27 and extend into the support 22, to connect to a component inside the support 22.

The circuit board 26 and the control module are housed in the support 22. One end of the male connector 21 is connected to the circuit board 26. A connection terminal in the male connector 21 is electrically connected to the control module. A component on the circuit board 26 is not shown in FIG. 6.

The end that is of the male connector 21 and that is connected to the circuit board 26 is housed in the support 22, and an end that is of the male connector 21 and that is away from the circuit board 26 is outside the support 22. The end that is of the male connector 21 and that is connected to the circuit board 26 is inside the male connector sleeve 23. The end that is of the male connector 21 and that is away from the circuit board 26 is used to plug into the female connector part 1 or another device.

The protective cover 24 is installed outside the support 22. The button board 25 is installed outside the support 22. The button board 25 and the protective cover 24 are staggered from each other. The button board 25 and the protective cover 24 are separately installed on two sides of the support 22.

In this embodiment, the protective cover 24 is disposed on the support 22, and the protective cover 24 and the support 22 form a double-layer sleeve structure. The double-layer sleeve structure enables the male connector part 2 to have relatively high overall flexural strength. The double-layer sleeve structure can also protect a component (such as the circuit board 26) inside the support 22. Because a part of the male connector 21 is inside the male connector sleeve 23, and a part of the male connector sleeve 23 is inside the support 22, the male connector sleeve 23, the support 22, and the protective cover 24 can form a three-layer sleeve structure. Therefore, the male connector 21 is better protected, so that strength reliability of the male connector 21 is higher.

Flexural strength of the male connector sleeve 23 may be greater than or equal to 90 MPa (MPa). In this case, the male connector sleeve 23 has sufficient flexural strength to better protect the male connector 21.

In an embodiment, the male connector sleeve 23 may use a polyformaldehyde (polyformaldehyde, POM, commonly referred to as polyoxymethylene) material. A basic thickness of the male connector sleeve 23 may be in a range from 0.6 millimeter (mm) to 0.8 millimeter. For example, the basic thickness of the male connector sleeve 23 may be 0.65 millimeter. In this application, a range "A to B" includes an endpoint "A" and an endpoint "B". The basic thickness of the male connector sleeve 23 is a thickness of a thinnest region of the male connector sleeve 23.

In another embodiment, the male connector sleeve 23 may alternatively use a polycarbonate (polycarbonate, PC) material, a polybutylene terephthalate (polybutylene terephthalate, PBT) material, a polybutylene terephthalate material with glass fiber (glass fiber, GF), a copolymer and mixture of polycarbonate (polycarbonate, PC) and acrylonitrile butadiene styrene (acrylonitrile butadiene styrene, ABS) (PC+ABS), a polyamide (polyamide, PA) material with 15% glass fiber, or a polyamide material with 30% glass fiber. In this case, the basic thickness of the male connector sleeve 23 may be in the range from 0.6 millimeter to 0.8 millimeter.

In another embodiment, the male connector sleeve 23 may alternatively be an aluminum (Al) alloy die casting, a zinc (Zn) alloy die casting, or a metal-insulator-metal (metal insulator metal, MIM) die casting. In this case, the basic thickness of the male connector sleeve 23 is in a range from 0.5 millimeter to 0.8 millimeter.

Flexural strength of the support 22 may be greater than or equal to 90 MPa. In this case, the support 22 has sufficient flexural strength. Therefore, the support 22 can better cooperate with the male connector sleeve 23, to better protect the male connector 21, so that the strength reliability of the male connector 21 is higher. The flexural strength of the support 22 is flexural strength of an entire structure including the support body 221 and the support cover 222.

The male connector 21 may be a universal serial bus Type-C (universal serial bus type-C, USB-C) connector (or referred to as Type-C), a micro universal serial bus (micro universal serial bus, micro USB) connector, or a lightning (lighting) connector. A type of the female socket 12 of the female connector part 1 corresponds to a type of the male connector 21. In this case, both the male connector 21 and the female socket 12 are relatively universal connectors.

This helps enlarge an application scope of the control box 70 and the wireless headset 100.

Referring to FIG. 5, in an optional embodiment, the control module may include at least one processor 261, at least one memory 262, a wireless communications module 263, an audio management module 265, a power management module 266, and the like. The processor 261 may include one or more interfaces, configured to connect to another module in the control module.

The at least one memory 262 is configured to store program code. The at least one processor 261 is configured to execute the application program code. The wireless communications module 263 is configured to support data exchange in wireless communication between the control box 70 and the paired device. The audio management module 265 is configured to manage audio data. The power management module 266 is configured to receive charging input or output power by using the male connector 21. Details are as follows:

The at least one memory 262 may be configured to store the program code, for example, program code used to charge the wireless headset 100 and application program code used to perform wireless pairing connection with the paired device. The at least one memory 262 may further store a Bluetooth address used to uniquely identify the wireless headset 100. In addition, the at least one memory 262 may further store a pairing history of a paired device that has been successfully paired with the wireless headset 100 before. Based on the pairing history, the wireless headset 100 can automatically establish a connection to the paired device that has been paired with the wireless headset 100. The Bluetooth address may be a media access control (media access control, MAC) address.

The at least one processor 261 may be configured to execute the application program code, and invoke related modules such as the audio management module 265 and the power management module 266, to implement a function of the wireless headset 100 in this embodiment of this application, for example, to implement a charging function and an audio data playing function of the wireless headset 100.

The wireless communications module 263 may be configured to support data exchange in wireless communication between the control box 70 of the wireless headset 100 and the paired device. The wireless communication includes a wireless local area network (wireless local area networks, WLAN) (such as a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and infrared (infrared, IR). In some embodiments, the wireless communications module 263 may be a first wireless chip, for example, a first Bluetooth chip. The wireless headset 100 may perform pairing with and establish a wireless connection to a Bluetooth chip of the paired device through the first Bluetooth chip, to implement short-distance data exchange between the wireless headset 100 and the paired device through the wireless connection.

The audio management module 265 may be configured to manage audio data and control an earpiece part (for example, the first earpiece 40 and the second earpiece 60) of the wireless headset 100 to play an audio signal (for example, play a dual-channel signal or a mono signal). In some embodiments, the audio management module 265 may obtain an audio signal from the wireless communications module 263 or the male connector 21 of the male connector part 2, or transfer an audio signal to the wireless communications module 263 or the male connector 21 of the male connector part 2, to implement a function such as answering/making a call, playing music, enabling/disabling a voice assistant of the paired device connected to the headset, or receiving/sending voice data of a user by using the wireless headset 100.

The power management module 266 may be configured to receive charging input or output power by using the male connector 21 of the male connector part 2. In other words, the power management module 266 may be configured to support the wireless headset 100 in receiving charging input, or charging another electronic device. For example, when the male connector 21 of the male connector part 2 is connected to or directly plugged into a power supply device, the power management module 266 receives charging input by using the male connector 21 of the male connector part 2. In some embodiments of wireless charging, the power management module 266 may receive wireless charging input by using a wireless charging coil. When receiving the charging input to charge the battery of the wireless headset 100, the power management module 266 may further supply power for normal working of the wireless headset 100.

The power management module 266 may be further configured to supply power to modules such as the at least one processor 261, the at least one memory 262, and the wireless communications module 263. The power management module 266 may be further configured to monitor parameters such as a battery capacity, a battery cycle count, and a battery health status (electric leakage or impedance). In some other embodiments, the power management module 266 may alternatively be disposed in the processor 261.

A plurality of trigger parts 266 are further disposed on the circuit board 26. The plurality of trigger parts 266 are electrically connected to the control module. Each trigger part 266 is configured to respond to a trigger action, so that the wireless headset 100 performs a corresponding operation, for example, increasing volume, decreasing volume, playing a previous song, playing a next song, answering an incoming call, hanging up an incoming call, charging, or ending charging.

In an optional embodiment, the button board 25 includes a plurality of buttons 251. The plurality of buttons 251 correspond to the plurality of trigger parts 266 on the circuit board 26. When being pressed, the plurality of buttons 251 abut against the plurality of trigger parts 266 to trigger the trigger parts 266, so that the wireless headset 100 performs corresponding operations.

An appearance of the button board 25 varies with an appearance of the support 22. For example, when a cross section of the support 22 is roughly in a shape of a flattened runway (including two oppositely arranged straight edges and opposite arc edges each connected to the two straight edges), the button board 25 may be roughly in a U-shape (including one straight edge and two arc edges connected to two ends of the straight edge, where the arc edge may be shorter than the arc edge of the support 22) or another shape wrapping the support.

In this embodiment, a shape of the button board 25 varies with the appearance of the support 22, so that the button board 25 can better fit the support 22, overall structural strength of the male connector part 2 is higher, and the trigger parts can be more smoothly triggered by using the buttons on the button board 25. In addition, an overall shape of the male connector part 2 can also vary with that of the support 22, so that the overall male connector part 2 is in a flattened shape. This helps increase structural strength and facilitates holding and operating of the user.

In an optional embodiment, as shown in FIG. 5, the male connector part 2 may further include a microphone 267. The microphone 267 is housed in the support 22. The microphone 267 may also be referred to as a "mike" or a "microphone", and is configured to convert a sound signal into an audio electrical signal. For example, when the wireless headset 100 is used as an audio input device of the paired device, in a process in which the user talks (for example, makes a call or sends a voice message), the microphone 267 may collect a sound signal of the user, to control the wireless headset 100 to perform a corresponding operation, or convert the sound signal into an audio signal, and send the audio signal to the paired device.

A first through hole is disposed on the support 22, and a second through hole 244 is disposed on the protective cover 24. The sound signal can enter the support 22 through the second through hole 244 and the first through hole, so that the sound signal is received by the microphone 267.

In an optional embodiment, the male connector part 2 may further include an antenna (not shown in the figure). The wireless communications module 263 receives an electromagnetic wave through the antenna, performs frequency modulation and filtering processing on an electromagnetic wave signal, and sends a processed signal to the at least one processor 261. The wireless communications module 263 may further receive a to-be-sent signal from the at least one processor 161, perform frequency modulation and amplification on the signal, and convert the signal into an electromagnetic wave for radiation through the antenna.

Figure 7:
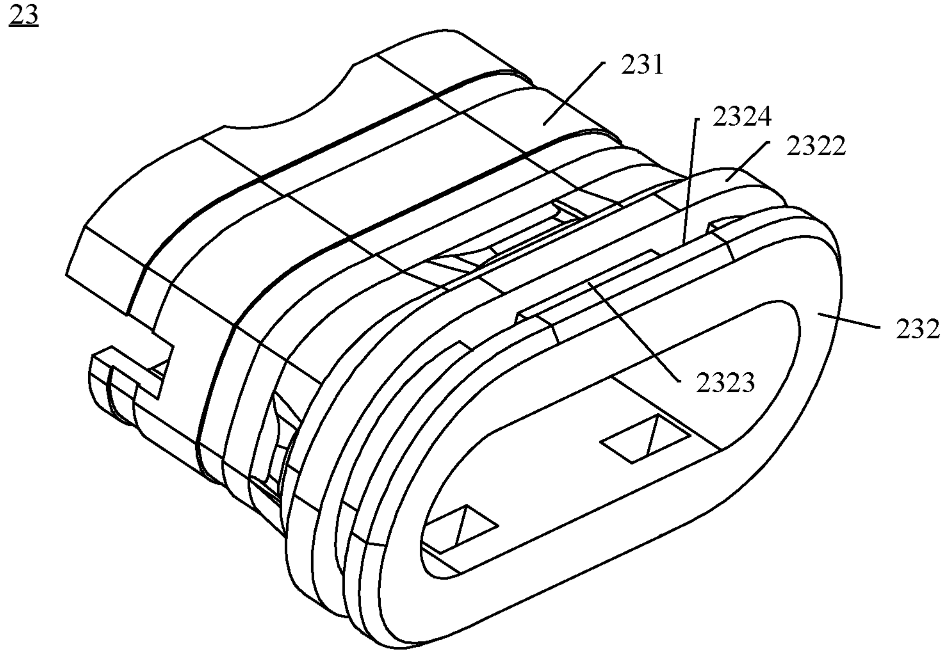
FIG. 7 is a schematic structural diagram of a sleeve of the male connector in FIG. 5.
Figure 8:
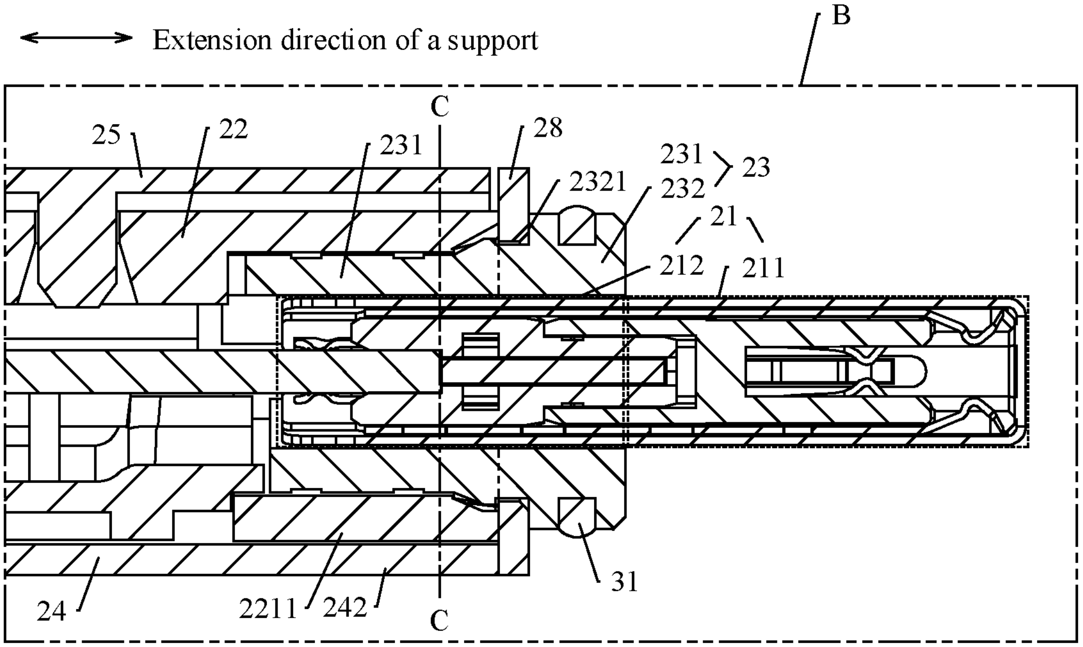
FIG. 8 is an enlarged schematic diagram of a structure in a position B in FIG. 6.

Referring to FIG. 5, FIG. 7, and FIG. 8, FIG. 7 is a schematic structural diagram of the male connector sleeve 23 in FIG. 5, and FIG. 8 is an enlarged schematic diagram of a structure in a position B in FIG. 6.

The male connector sleeve 23 includes a fixed part 231 and an extended part 232 connected to one end of the fixed part 231. The fixed part 231 and the extended part 232 may be integrally formed. The fixed part 231 is housed in the support 22, and the extended part 232 is outside the support 22. Optionally, the fixed part 231 and the extended part 232 are arranged in the extension direction of the support 22.

The male connector 21 includes a plug end 211 and a fixed end 212 connected to one end of the plug end 211. The plug end 211 is outside the support 22. The fixed end 212 is fastened to the inside of the fixed part 231 after passing through the extended part 232. In this case, the fixed end 212 is also fastened relative to the extended part 232. The fixed end 212 is fastened to the inside of the male connector sleeve 23. The fixed end 212 and the male connector sleeve 23 may be fastened to each other through interference fit. Optionally, the fixed end 212 and the plug end 211 are arranged in the extension direction of the support 22. When the male connector part 2 is connected to the female connector part 1, the plug end 211 is housed in the female connector part 1. The plug end 211 is used to plug into a power supply device when the male connector part 2 is detached from the female connector part 1.

In this embodiment, when the male connector part 2 is detached from the female connector part 1, the plug end 211 of the male connector 21 can be plugged into the power supply device, and the power supply device can directly charge the wireless headset 100 by using the male connector 21 without using an additional connection wire. Therefore, the control box 70 improves charging convenience of the wireless headset 100.

The fixed end 212 of the male connector 21 is fastened to the inside of the fixed part 231 of the male connector sleeve 23, and the fixed part 231 is housed in the support 22. Therefore, the fixed part 231 and the support 22 fasten and protect the fixed end 212 in a form of a double-layer sleeve. This can reduce a risk of damage such as bending of the male connector 21 due to external force, so that the strength reliability of the male connector 21 is high. The male connector 21 is applicable to a use environment of frequent plugging and unplugging, and has a relatively long service life.

The fixed part 231 of the male connector sleeve 23 is inside the support 22 and the extended part 232 is outside the support 22. In other words, a part of the male connector sleeve 23 is inside the support 22 and a part of the male connector sleeve 23 is outside the support 22. The fixed end 212 is inside the male connector sleeve 23. Therefore, when the plug end 211 is inclined or slightly bent relative to the support 22, the male connector sleeve 23 can bear a press stress or a tensile stress between an end part of the support 22 and the male connector 21, so that a risk of damage to the male connector 21 is reduced, and the strength reliability of the male connector 21 is further ensured.

Referring to FIG. 4, FIG. 5, and FIG. 8, the male connector part 2 further includes a stop ring 28. The stop ring 28 is disposed outside the male connector sleeve 23 in a form of a sleeve. Specifically, the stop ring 28 is disposed outside the extended part 232 in a form of a sleeve. A stop surface 2321 facing the support 22 is disposed on the extended part 232, and the stop ring 28 is located between the stop surface 2321 and an end surface of one end of the support 22. The stop ring 28 can position the male connector sleeve 23 and the support 22, to prevent the male connector sleeve 23 from excessively extending into the support 22, so that assembly precision of the male connector part 2 is relatively high, and a product yield rate is relatively high. In an embodiment, the stop ring 28 is fastened to the male connector sleeve 23 in an assembled manner. In another embodiment, the stop ring 28 and the male connector sleeve 23 are integrally formed.

One end of the protective cover 24 may abut against the stop ring 28. One end of the button board 25 may abut against the stop ring 28.

Referring to FIG. 5 and FIG. 6, in an optional embodiment, the protective cover 24 is installed outside the support 22, and extends from one end of the support 22 to the other end of the support 22. Flexural strength of the protective cover 24 is greater than or equal to the flexural strength of the support 22.

In this embodiment, the protective cover 24 covering the support 22 can improve flexural performance of the support 22, so that overall flexural strength of the male connector part 2 is higher, and the male connector 21 and components (for example, the circuit board 26) inside the support 22 can achieve better structural protection. In another embodiment, the flexural strength of the protective cover 24 may alternatively be slightly less than the flexural strength of the support 22.

That the protective cover 24 extends from one end of the support 22 to the other end of the support 22 is that one end part 242 of the protective cover 24 is outside one end of the support 22, and the other end part 243 of the protective cover 24 is outside the other end of the support 22. Two ends of the support 22 are partially surrounded by the corresponding end parts (242, 243) of the protective cover 24. Therefore, as shown in FIG. 8, the end part 242 of the protective cover 24, an end part 2211 of the support 22, and the fixed part 231 of the male connector sleeve 23 jointly form a three-layer sleeve structure, and overall flexural strength of the three-layer sleeve structure is very high. In this way, a risk of damage such as bending caused by external force on the male connector 21 protected by the three-layer sleeve structure is very low, strength reliability of the male connector 21 is high, and a service life of the control box 70 is longer.

In an embodiment, the protective cover 24 is made of aluminum. For example, the protective cover 24 is an extruded aluminum profile. A basic thickness of the protective cover 24 is in a range from 0.5 millimeter to 0.7 millimeter. For example, the basic thickness of the protective cover 24 is 0.5 millimeter. In another embodiment, the protective cover 24 may alternatively be an aluminum (Al) alloy die casting, a zinc (Zn) alloy die casting, or a metal-insulator-metal (metal insulator metal, MIM) die casting.

Figure 9:
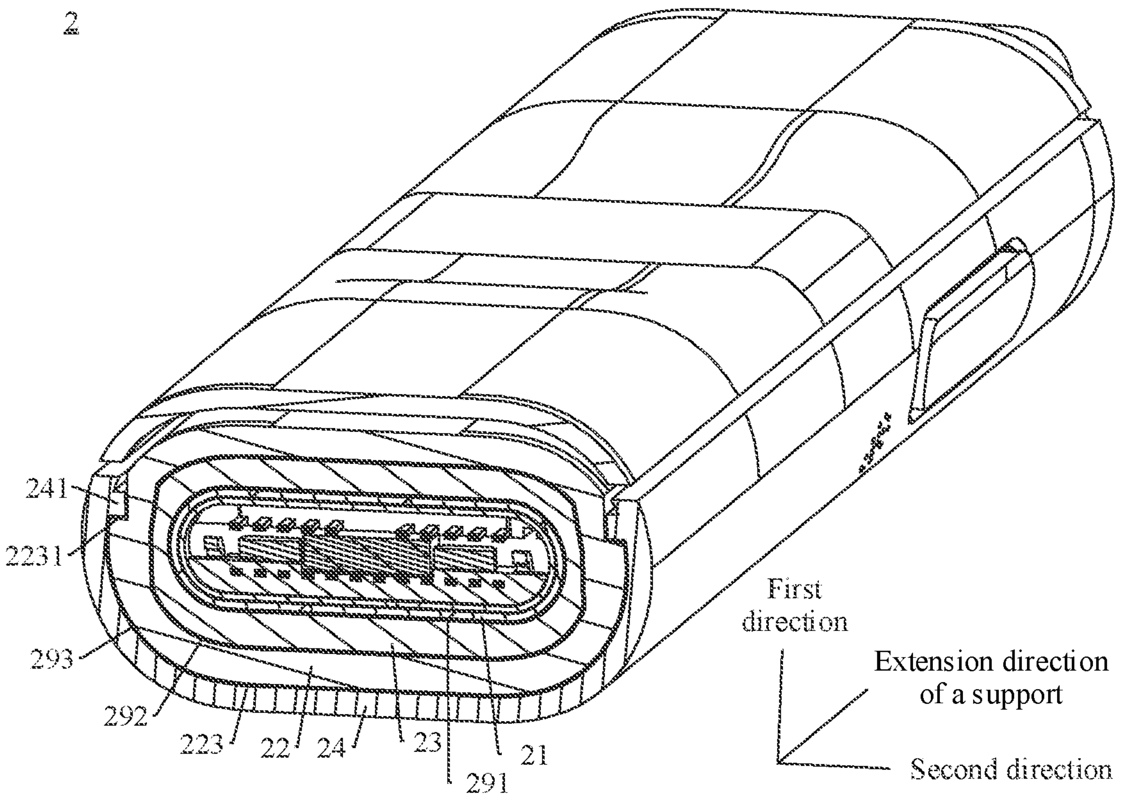
FIG. 9 is a schematic diagram of an internal structure of the male connector part shown in FIG. 4.

FIG. 9 is a schematic diagram of an internal structure of the male connector part 2 shown in FIG. 4. A cross section in the structure shown in FIG. 9 is a first plane C in FIG. 4.

In an optional embodiment, the support 22 has a first outer diameter in a first direction. The support 22 has a second outer diameter in a second direction. The first direction is perpendicular to the extension direction of the support 22. The first direction may be located on the first plane C. The extension direction of the support 22 is a direction from one end of the support 22 to the other end of the support 22. The second direction is perpendicular to the first direction and the extension direction of the support 22. The second direction may be located on the first plane C. Both the first outer diameter and the second outer diameter are sizes of a cross-sectional shape of the support 22. A ratio of the second outer diameter to the first outer diameter is in a range from 1.5 to 2.5. In this case, the support is in a flattened shape.

In this embodiment, because the support 22 is in the flattened shape, and the support 22 is a main framework of the male connector part 2 and determines a body shape of the male connector part 2, the male connector part 2 is also roughly in a flattened shape. The flattened male connector part 2 has relatively high structural strength, and the flattened shape also facilitates holding and operating of the user.

In an optional embodiment, a projection of an outer surface 223 of the support 22 on the first plane C (corresponding to the first plane C in FIG. 4 and a position of a line C-C in FIG. 8) has a first length. A projection, on the first plane C, of a region that is of the support 22 and that is covered by the protective cover 24 has a second length. The region that is of the support 22 and that is covered by the protective cover 24 is a part of the outer surface 223 of the support 22. A percentage of the second length to the first length is greater than or equal to 50%. The first plane C is perpendicular to the extension direction of the support 22. In other words, the protective cover 24 covers at least half of the support 22 in terms of a circle. For example, in this embodiment, the percentage of the second length to the first length may be greater than or equal to 65%.

In this embodiment, the percentage of the second length to the first length is greater than or equal to 50%. Therefore, the protective cover 24 covers half or more of the support 22, so that the protective cover 24 can sufficiently protect the support 22, and overall structural strength of the male connector part 2 is higher.

An appearance of the protective cover 24 varies with the appearance of the support 22. For example, when a cross section of the support 22 is roughly in a shape of a flattened runway (including two oppositely arranged straight edges and opposite arc edges each connected to the two straight edges), the protective cover 24 may be roughly in a U-shape (including one straight edge and two arc edges connected to two ends of the straight edge, where the arc edge may be shorter than the arc edge of the support 22) or another shape wrapping the support 22.

In this embodiment, a shape of the protective cover 24 varies with the appearance of the support 22, so that the protective cover 24 can better fit the support 22, and overall structural strength of the male connector part 2 is higher. In addition, an overall shape of the male connector part 2 can also vary with that of the support 22, so that the overall male connector part 2 is in a flattened shape. This helps increase structural strength and facilitates holding and operating of the user.

Two end parts of the protective cover 24 may be fastened to the support 22 by using a fastening structure. For example, concave fastening grooves 2231 are disposed on the outer surface 223 of the support 22. Fasteners 241 are disposed at the two end parts of the protective cover 24. The fasteners 241 are fastened to the fastening grooves 2231, so that the protective cover 24 is fastened to the outside of the support 22.

Referring to FIG. 9, in an optional embodiment, the male connector part 2 further includes a first adhesive layer 291. The first adhesive layer 291 is located between the male connector 21 and the male connector sleeve 23. The male connector 21 adheres to the male connector sleeve 23 by using the first adhesive layer 291. The first adhesive layer 291 can increase connection firmness between the male connector 2 and the male connector sleeve 23, so as to increase overall strength of the male connector part 2. The first adhesive layer 291 can also seal a gap between the male connector 21 and the male connector sleeve 23. In this way, waterproofing and dustproofing are implemented, so that a service life of the male connector part 2 is longer.

The first adhesive layer 291 may be formed in an adhesive dispensing manner, or may be an adhesive film or an adhesive sheet such as double-sided tape.

The first adhesive layer 291 may be disposed around the male connector 21 in a circumferential direction of the male connector 21, so that a connection between the male connector 21 and the male connector sleeve 23 is firmer and more reliable. The circumferential direction of the male connector 21 is disposed around an extension direction of the male connector 21. The extension direction of the male connector 21 is the same as the extension direction of the support 22.

Still referring to FIG. 9, in an optional embodiment, the male connector part 2 further includes a second adhesive layer 292. The second adhesive layer 292 is located between the male connector sleeve 23 and the support 22. The male connector sleeve 23 adheres to the support 22 by using the second adhesive layer 292. The second adhesive layer 292 can increase connection firmness between the male connector sleeve 23 and the support 22, so as to increase overall strength of the male connector part 2. The second adhesive layer 292 can also seal a gap between the male connector sleeve 23 and the support 22. In this way, waterproofing and dustproofing are implemented, so that a service life of the male connector part 2 is longer.

The second adhesive layer 292 may be formed in an adhesive dispensing manner, or may be an adhesive film or an adhesive sheet such as double-sided tape.

The second adhesive layer 292 may be disposed around the fixed part 231 (referring to FIG. 8) of the male connector sleeve 23 in a circumferential direction of the male connector sleeve 23. The circumferential direction of the male connector sleeve 23 is disposed around an extension direction of the male connector sleeve 23. The extension direction of the male connector sleeve 23 is the same as the extension direction of the support 22.

Still referring to FIG. 9, in an optional embodiment, the male connector part 2 further includes a third adhesive layer 293. The third adhesive layer 293 is located between the protective cover 24 and the support 22. The protective cover 24 adheres to the support 22 by using the third adhesive layer 293. The third adhesive layer 293 can increase connection firmness between the protective cover 24 and the support 22, so as to increase overall strength of the male connector part 2. The third adhesive layer 293 can also seal a gap between the protective cover 24 and the support 22. In this way, waterproofing and dustproofing are implemented, so that a service life of the male connector part 2 is longer.

The third adhesive layer 293 may be formed in an adhesive dispensing manner, or may be an adhesive film or an adhesive sheet such as double-sided tape.

The third adhesive layer 293 may be disposed partially around the support 22 in a circumferential direction of the support 22, so that a connection between the support 22 and the protective cover 24 is firmer and more reliable. The circumferential direction of the support 22 is disposed around the extension direction of the support 22.

In an embodiment, the protective cover 24, the third adhesive layer 293, the support 22, the second adhesive layer 292, the male connector sleeve 23, and the first adhesive layer 291 jointly form an alternately combined structure including three sleeves and three adhesive layers. Flexural strength of the entire structure is very high, and the male connector 21 can be effectively protected. Therefore, the male connector 21 has high structural reliability, is applicable to more use environments, and has a longer service life. Experiments prove that the male connector 21 of the control box 70 can pass a strength test of an industry standard 0.75 Newton-meter (Nm) in a thrust test.

Figure 10:
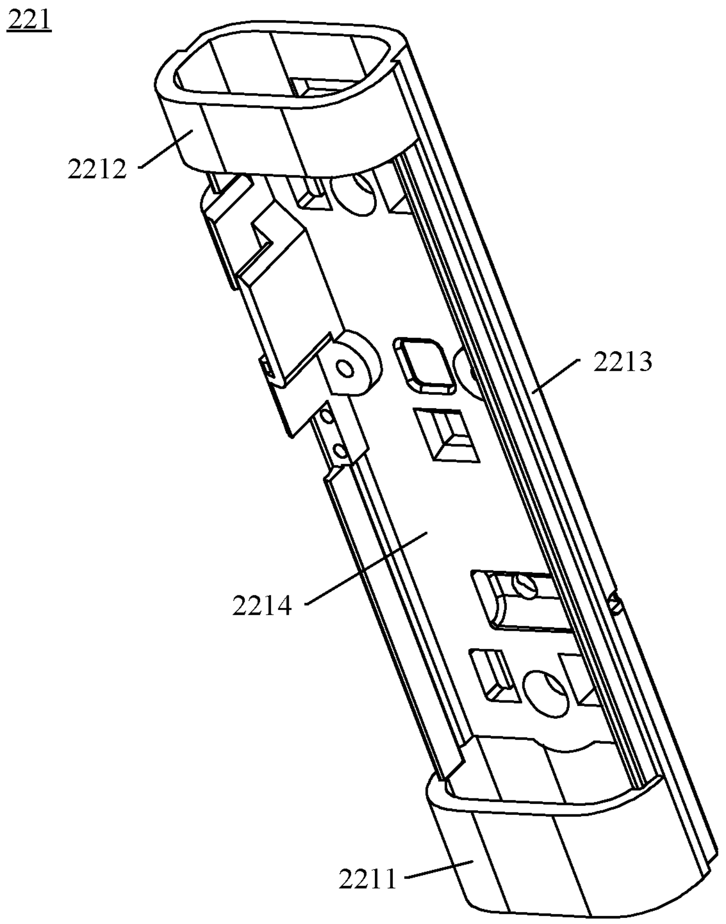
FIG. 10 is a schematic structural diagram of a support body in FIG. 4.

Referring to FIG. 5, FIG. 6, and FIG. 10, FIG. 10 is a schematic structural diagram of the support body 221 in FIG. 4.

The support 22 includes the support body 221 and a support cover 222. The support body 221 includes two end parts (2211, 2212) and a middle part 2213 between the two end parts (2211, 2212). The two end parts (2211, 2212) of the support body 221 form two ends of the support 22. The two end parts (2211, 2212) of the support body 221 each have a complete cylindrical structure. One end part 2211 of the support body 221 is disposed around the fixed part 231 of the male connector sleeve 23. The end part 2212 (that is, the other end part 2212) that is of the support body 221 and that is away from the male connector sleeve 23 is disposed around a part of the cable sleeve 27. A notch 2214 is disposed at the middle part 2213 of the support body 221. The notch 2214 connects the inside and the outside of the support body 221. The support cover 222 covers the notch 2214. Flexural strength of the support body 221 is greater than or equal to flexural strength of the support cover 222.

In this embodiment, the flexural strength of the support body 221 is relatively high, and the end part 2211 of the support body 221 is disposed around the fixed part 231 of the male connector sleeve 23. Therefore, flexural strength of a part that is of the support 22 and that is used to fasten and protect the male connector sleeve 23 and the male connector 21 is high, so that structural reliability of the male connector 21 is higher.

The notch 2214 is disposed on the support body 221. Therefore, some other components (for example, the circuit board 26) of the male connector part 2 may be quickly and conveniently installed inside the support body 221 through the notch 2214, so that the components are housed in the support 22. For example, in the male connector part 2, the circuit board 26 may be fastened inside the support body 221 by using a fastening member 264. The support body 221 of the support 22 is configured to bear main force (for example, bending force or pressing force) acting on the support 22, and the support cover 222 is configured to cover the notch 2214, to assist in protecting a component inside the support body 221. Therefore, the flexural strength of the support cover 222 may be less than or equal to the flexural strength of the support body 221, to reduce costs of the support 22 while ensuring that the support 22 satisfies a basic strength requirement. In another embodiment, the flexural strength of the support cover 222 may alternatively be greater than the flexural strength of the support body 221.

In an embodiment, the support body 221 may use a polyformaldehyde (polyformaldehyde, POM, commonly referred to as polyoxymethylene) material. A basic thickness of the support body 221 may be in a range from 0.6 millimeter (mm) to 0.8 millimeter. For example, the basic thickness of the support body 221 may be 0.65 millimeter.

In another embodiment, the support body 221 may alternatively use a polycarbonate (polycarbonate, PC) material, a polybutylene terephthalate (polybutylene terephthalate, PBT) material, a polybutylene terephthalate material with glass fiber (glass fiber, GF), a copolymer and mixture of polycarbonate (polycarbonate, PC) and acrylonitrile butadiene styrene (acrylonitrile butadiene styrene, ABS), a polyamide (polyamide, PA) material with 15% glass fiber, or a polyamide material with 30% glass fiber. In this case, the basic thickness of the support body 221 may be in the range from 0.6 millimeter to 0.8 millimeter.

In another embodiment, the support body 221 may alternatively be an aluminum (Al) alloy die casting, a zinc (Zn) alloy die casting, or a metal-insulator-metal (metal insulator metal, MIM) die casting. In this case, the basic thickness of the support body 221 is in a range from 0.5 millimeter to 0.8 millimeter.

Referring to FIG. 5 and FIG. 6, in an optional embodiment, the protective cover 24 is installed outside the support 22, and covers the support cover 222. The protective cover 24 is connected to the support body 221. The fastening grooves 2231 are disposed on the support body 221. The flexural strength of the protective cover 24 is greater than or equal to the flexural strength of the support cover 222.

In this embodiment, the flexural strength of the protective cover 24 is relatively high, and the protective cover 24 covers the outside of the support 22. Therefore, the protective cover 24 and the support 22 can be used together to increase overall structural strength of the male connector part 2. This helps better protect the male connector 21 and a component inside the support 22. The protective cover 24 covers the support cover 222, and the flexural strength of the protective cover 24 is greater than or equal to the flexural strength of the support cover 222. Therefore, the protective cover 24 can protect a relatively weak part on the support 22, so that overall structural strength reliability of the male connector part 2 is higher. In an embodiment, the flexural strength of the protective cover 24 may be greater than or equal to the flexural strength of the support body 221.

Further, referring to FIG. 6 and FIG. 8, the end part 242 of the protective cover 24 is disposed partially around the fixed part 231. In this case, the end part 242 of the protective cover 24, the end part 2211 of the support 22, and the fixed part 231 of the male connector sleeve 23 jointly form a three-layer sleeve structure, and overall flexural strength of the three-layer sleeve structure is very high. In this way, a risk of damage such as bending caused by external force on the male connector 21 protected by the three-layer sleeve structure is very low, strength reliability of the male connector 21 is high, and a service life of the control box 70 is longer.

Figure 11:
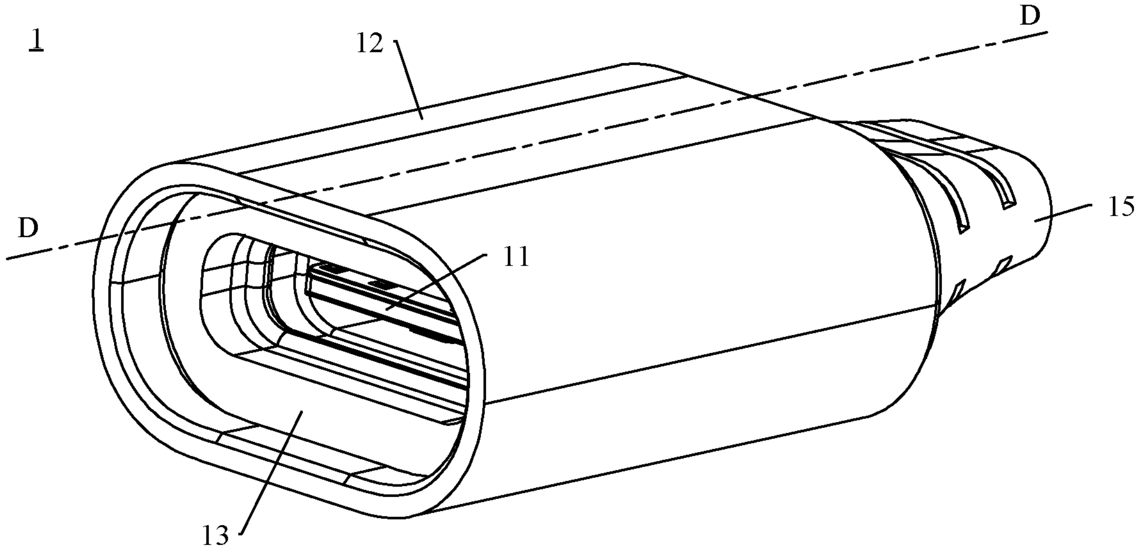
FIG. 11 is a schematic structural diagram of a female connector part of the control box shown in FIG. 3.
Figure 12:
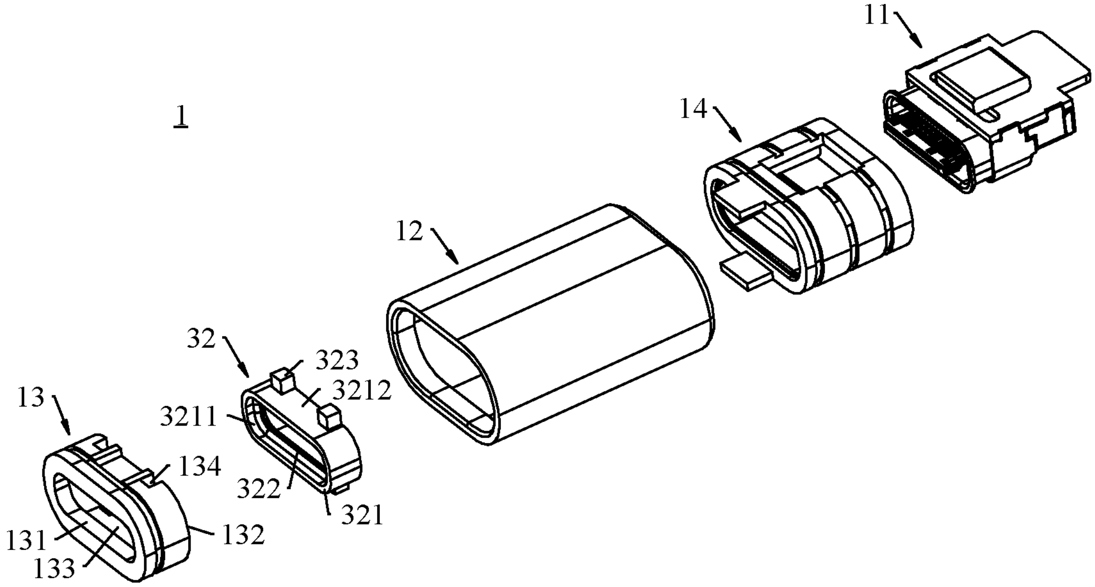
FIG. 12 is an exploded view of a partial structure of the female connector part shown in FIG. 11.
Figure 13:
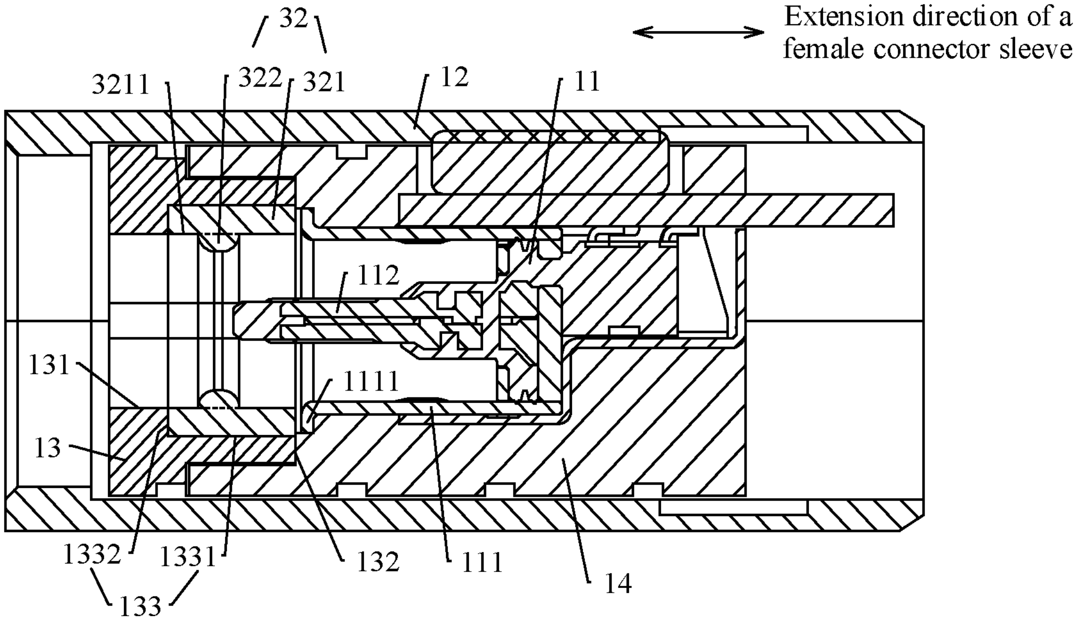
FIG. 13 is a cross-sectional view obtained after the partial structure of the female connector part shown in FIG. 11 is sectioned along a line D-D.

Referring to FIG. 11 to FIG. 13, FIG. 11 is a schematic structural diagram of the female connector part 1 of the control box 70 shown in FIG. 3, FIG. 12 is an exploded view of a partial structure of the female connector part 1 shown in FIG. 11, and FIG. 13 is a cross-sectional view obtained after the partial structure of the female connector part 1 shown in FIG. 11 is sectioned along a line D-D. The structure shown in FIG. 13 corresponds to the structure shown in FIG. 12.

In an optional embodiment, the female connector part 1 includes a female connector sleeve 12 and the female socket 11 housed in the female connector sleeve 12. Referring to FIG. 3, when the male connector part 2 is connected to the female connector part 1, a part of the male connector 21 of the male connector part 2 extends into the female connector sleeve 12, and a part of the male connector sleeve 23 of the male connector part 2 extends into the female connector sleeve 12. Specifically, when the male connector part 2 is connected to the female connector part 1, a part or all of the extended part 232 (referring to FIG. 8) of the male connector sleeve 23 is housed in the female connector sleeve 12, and the plug end 211 (referring to FIG. 8) of the male connector 21 is housed in the female connector sleeve 12 and is connected to the female socket 11. When the male connector 21 is connected to the female socket 11, an electrical signal may be transmitted between the male connector 21 and the female socket 11.

In this embodiment, the female connector sleeve 12 can protect the female socket 11. When the male connector part 2 is connected to the female connector part 1, the female connector part 1 can protect the male connector 21 and the extended part 232 of the male connector sleeve 23, so that the control box 70 has high reliability.

The female connector sleeve 12 may use a polyformaldehyde material, a polycarbonate material, a polybutylene terephthalate material, a polybutylene terephthalate material with glass fiber, a copolymer and mixture of polycarbonate and acrylonitrile butadiene styrene, a polyamide material with 15% glass fiber, a polyamide material with 30% glass fiber, an aluminum alloy die casting, a zinc alloy die casting, or a metal-insulator-metal die casting. In an embodiment, a material of the female connector sleeve 12 may be the same as a material of the male connector sleeve 23, to reduce a quantity of material types of the control box 70 and reduce costs of the control box 70. In addition, appearance consistency between the female connector sleeve 12 and the male connector sleeve 23 is high. This also helps improve user experience of the control box 70.

A shape of the female connector sleeve 12 varies with an appearance of the male connector part 2. For example, if the male connector part 2 is roughly in a flattened shape, the female connector sleeve 12 is also roughly in a flattened shape. The female connector sleeve 12 has a third outer diameter in a third direction and has a fourth outer diameter in a fourth direction. A ratio of the fourth outer diameter to the third outer diameter is in a range from 1.5 to 2.5. The third direction is perpendicular to an extension direction of the female connector sleeve 12. The fourth direction is perpendicular to the third direction and the extension direction of the female connector sleeve 12. In this case, the entire control box 70 is in a flattened shape, overall structure strength is relatively high, and appearance consistency is high. This facilitates holding and operating of the user.

Referring to FIG. 3, in an optional embodiment, the control box 70 further includes one or more waterproof rings 3. The one or more waterproof rings 3 are circularly disposed outside the male connector part 2 and/or inside the female connector part 1, to seal a gap between the female connector part 1 and the male connector part 2 when the male connector part 2 is connected to the female connector part 1. In this application, "and/or" represents three solutions. For example, "A and/or B" includes three solutions: "A", "B", and "A and B".

Because the male connector part 2 and the female connector part 1 of the control box 70 are in a detachable connection relationship, a waterproof structure needs to be disposed between the male connector part 2 and the female connector part 1, to ensure reliability of the control box 70. In this embodiment, the one or more waterproof rings 3 are disposed, so that when the male connector part 2 is connected to the female connector part 1, the gap between the male connector part 2 and the female connector part 1 is sealed. Therefore, external water vapor or dust is prevented from entering the control box 70 through the gap between the male connector part 2 and the female connector part 1. In this way, waterproofing and dustproofing effects of the control box 70 are very good. Because the one or more waterproof rings 3 are circularly disposed outside the male connector part 2 and/or inside the female connector part 1, the one or more waterproof rings 3 can continuously seal the gap between the male connector part 2 and the female connector part 1 in a circumferential direction of the control box 70, so that waterproofing and dustproofing performance of the control box 70 is more reliable. Experiments prove that, in this embodiment, the control box 70 can satisfy a test standard of IPX5 waterproofing (which can eliminate harmful impact caused when nozzles spray water in all directions).

In an embodiment, there are a plurality of waterproof rings 3. The plurality of waterproof rings 3 includes a first waterproof ring 31 and a second waterproof ring 32. The first waterproof ring 31 is located at the male connector part 2. The second waterproof ring 32 is located at the female connector part 1. The plurality of waterproof rings 3 may include the first waterproof ring 31 and the second waterproof ring 32, or may include the first waterproof ring 31, the second waterproof ring 32, and another waterproof ring.

In an embodiment, there are one or more waterproof rings 3. The one or more waterproof rings 3 include a first waterproof ring 31. The first waterproof ring 31 is located at the male connector part 2. When there is one waterproof ring 3, the waterproof ring 3 includes the first waterproof ring 31. When there are a plurality of waterproof rings 3, the waterproof rings 3 include the first waterproof ring 31 and another waterproof ring (for example, a second waterproof ring 32).

In an embodiment, there are one or more waterproof rings 3. The one or more waterproof rings 3 include a second waterproof ring 32. The second waterproof ring 32 is located at the female connector part 1. When there is one waterproof ring 3, the waterproof ring 3 includes the second waterproof ring 32. When there are a plurality of waterproof rings 3, the waterproof rings 3 include the second waterproof ring 32 and another waterproof ring (for example, a first waterproof ring 31).

Briefly, in an optional embodiment, there is one waterproof ring 3. The waterproof ring 3 may be a first waterproof ring 31 or a second waterproof ring 32. In another optional embodiment, there are a plurality of waterproof rings 3. The plurality of waterproof rings 3 may include but are not limited to a first waterproof ring 31 or a second waterproof ring 32. In this case, the plurality of waterproof rings 3 can form a multi-layer seal between the male connector part 2 and the female connector part 1, so that the control box 70 has better waterproofing and dustproofing performance.

In an embodiment, there are at least two waterproof rings 3 disposed at the male connector part 2, and the at least two waterproof rings 3 are disposed at intervals from each other. In this case, two or more seals can be implemented at the male connector part 2 of the control box 70. Therefore, the control box 70 has better waterproofing and dustproofing performance. In another embodiment, there are at least two waterproof rings 3 disposed at the female connector part 1. The at least two waterproof rings 3 are disposed at intervals from each other. In this case, two or more seals can be implemented at the female connector part 1 of the control box 70. Therefore, the control box 70 has better waterproofing and dustproofing performance. In still another embodiment, at least one waterproof ring 3 is a first waterproof ring 31, and at least one waterproof ring 3 is a second waterproof ring 32. In other words, at least one waterproof ring 3 is disposed at the male connector part 2, and at least one waterproof ring 3 is disposed at the female connector part 1. In this case, two or more seals are implemented for the control box 70 through cooperation between the male connector part 2 and the female connector part 1, and waterproofing and dustproofing performance is good. When a plurality of waterproof rings 3 can be separately installed at the male connector part 2 and the female connector part 1, the plurality of waterproof rings 3 may be assembled to the male connector part 2 and the female connector part 1 at the same time. This helps shorten overall assembly duration of the control box 70 and reduce production costs of the control box 70.

Referring to FIG. 4, FIG. 5, FIG. 7, and FIG. 8, in an optional embodiment, the control box 70 further includes a first waterproof ring 31. The first waterproof ring 31 is circularly fastened to an outer sidewall 2322 of the extended part 232. The first waterproof ring 31 is outside the support 22. When the male connector part 2 is connected to the female connector part 1, the first waterproof ring 31 is tightly pressed between the extended part 232 and the female connector sleeve 12.

In this embodiment, the first waterproof ring 31 is sleeved on the outside of the extended part 232 of the male connector sleeve 23, so that a gap between the male connector part 2 and the female connector part 1 can be sealed when the male connector part 2 is connected to the female connector part 1, and the first waterproof ring 31 does not affect plugging and unplugging of the male connector 21 when the male connector part 2 is detached from the female connector part 1 and is plugged into another device. This helps improve use experience of the wireless headset 100.

In an optional embodiment, referring to FIG. 5 and FIG. 7, the first waterproof ring 31 includes a sealing ring body 311 and a plurality of position-limiting blocks 312. The sealing ring body 311 is a continuous closed-loop ring body. The sealing ring body 311 is configured to seal the gap between the male connector part 2 and the female connector part 1 when the male connector part 2 is connected to the female connector part 1. The plurality of position-limiting blocks 312 are located on an inner side surface 3111 of the sealing ring body 311 at intervals. To be specific, a gap is formed between two adjacent position-limiting blocks 312. The sealing ring body 311 and the plurality of position-limiting blocks 312 may be integrally formed.

A concave groove 2323 and a plurality of position-limiting grooves 2324 are disposed on the outer sidewall 2322 of the extended part 232. The concave groove 2323 is a circular groove. The plurality of position-limiting grooves 2324 are located inside the concave groove 2323 at intervals and are connected to the concave groove 2323. A part of the sealing ring body 311 is housed in the concave groove 2323, and the plurality of position-limiting blocks 312 are housed in the plurality of position-limiting grooves 2324 in a one-to-one correspondence.

In this embodiment, the first waterproof ring 31 includes the plurality of position-limiting blocks 312 connected to the sealing ring body 311, the plurality of position-limiting grooves 2324 connected to the concave groove 2323 are disposed at the extended part 232, and the plurality of position-limiting blocks 312 are housed in the plurality of position-limiting grooves 2324 in a one-to-one correspondence. Therefore, the sealing ring body 311 can be more firmly installed in the concave groove 2323, and a risk that the first waterproof ring 31 is detached from the extended part 232 is very small, to ensure waterproofing reliability of the control box 70, so that the control box 70 has higher reliability and a longer service life.

Referring to FIG. 12 and FIG. 13, in an optional embodiment, the control box 70 further includes a second waterproof ring 32. The female connector part 1 further includes a fastening ring 13 housed in the female connector sleeve 12. The second waterproof ring 32 is fastened to an inner sidewall 131 of the fastening ring 13. When the male connector part 2 is connected to the female connector part 1, a part of the male connector 21 extends into the female connector sleeve 12, and the male connector 21 is plugged into the female socket 11 after passing through the second waterproof ring 32. The second waterproof ring 32 is tightly pressed between the fastening ring 13 and the male connector 21.

In this embodiment, when the male connector part 2 is connected to the female connector part 1, the second waterproof ring 32 is tightly pressed between the fastening ring 13 and the male connector 21. Therefore, the gap between the male connector part 2 and the female connector part 1 can be sealed, so that the control box 70 has better waterproofing performance.

The fastening ring 13 is connected to the female connector sleeve 12 by using an adhesive layer. The adhesive layer can improve waterproofing performance of the female connector part 1, so that the control box 70 has better waterproofing performance.

In an optional embodiment, the fastening ring 13 has a first sidewall 132 facing the female socket 11. A circular slot 133 is disposed on the inner sidewall 131 of the fastening ring 13, and the circular slot 133 extends to the first sidewall 132. Slot walls of the circular slot 133 include a slot bottom wall 1331 and a slot sidewall 1332, and the slot bottom wall 1331 of the circular slot 133 is connected to and is between the slot sidewall 1332 of the circular slot 133 and the first sidewall 132. A part of the second waterproof ring 32 is housed in the circular slot 133. The female socket 11 has a housing 111. The female socket 11 further includes a connection terminal 112 housed in the housing 111, and the connection terminal 112 is configured to connect to a connection terminal of the male connector 21. A circular flange 1111 is formed at an end that is of the housing 111 and that faces the fastening ring 13, and a part or all of the circular flange 1111 faces the second waterproof ring 32.

In this embodiment, the slot sidewall 1332 of the circular slot 133 can prevent the second waterproof ring 32 from moving away from the female socket 11, and the circular flange 1111 of the housing 111 of the female socket 11 can prevent the second waterproof ring 32 from moving close to the female socket 11. Therefore, the slot sidewall 1332 of the circular slot 133 and the circular flange 1111 of the housing 111 of the female socket 11 can jointly limit a position of the second waterproof ring 32, to avoid a case in which the second waterproof ring 32 has relatively large displacement and is detached from the fastening ring 13 when the second waterproof ring 32 is subject to force (for example, friction force existing during plugging and unplugging of the male connector part 2). In this way, the second waterproof ring 32 can be firmly fastened to the inside of the fastening ring 13, so that waterproofing performance of the control box 70 is reliable.

In an optional embodiment, the second waterproof ring 32 includes a positioning part 321 and a sealing part 322. The positioning part 321 is fastened to the circular slot 133. The sealing part 322 is circularly located on an inner side surface 3211 of the positioning part 321. A width of the positioning part 321 is greater than twice a width of the sealing part 322. The width of the positioning part 321 is a size of the positioning part 321 in the extension direction of the female connector sleeve 12. The width of the sealing part 322 is a size of the sealing part 322 in the extension direction of the female connector sleeve 12.

In this embodiment, the sealing part 322 mainly provides a sealing and waterproofing function, and the positioning part 321 is used to fasten the sealing part 322 to the fastening ring 13. When the male connector 21 is plugged into the female socket 11 or unplugged from the female socket 11, friction force between the male connector 21 and the sealing part 322 needs to be overcome. Therefore, the width of the sealing part 322 is relatively small, to ensure that the male connector 21 can be smoothly plugged and unplugged. If the width of the positioning part 321 is greater than twice the width of the sealing part 322, a fastening area between the second waterproof ring 32 and the fastening ring 13 is relatively large, and the second waterproof ring 32 can be more firmly fastened to the fastening ring 13.

In an optional embodiment, the second waterproof ring 32 further includes a plurality of reinforcing parts 323. The plurality of reinforcing parts 323 are located on an outer side surface 3212 of the positioning part 321 at intervals. The fastening ring 13 further has a plurality of reinforcing grooves 134 connected to the circular slot 133. The plurality of reinforcing grooves 134 are disposed at intervals from each other and all extend to the first sidewall 132. The plurality of reinforcing parts 323 are housed in the plurality of reinforcing grooves 134 in a one-to-one correspondence.

In this embodiment, the second waterproof ring 32 includes the plurality of reinforcing parts 323 that are located on the outer side surface 3212 of the positioning part 321 at intervals, and the plurality of reinforcing parts 323 are housed in the plurality of reinforcing grooves 134 of the fastening ring 13 in a one-to-one correspondence. The plurality of reinforcing parts 323 enable the positioning part 321 to be more stably housed in the circular slot 133. Therefore, the second waterproof ring 32 can be more firmly fastened to the fastening ring 13, and a risk that the second waterproof ring 32 is detached from the fastening ring 13 is very small, to ensure waterproofing reliability of the control box 70, so that the control box 70 has higher reliability and a longer service life.

Referring to FIG. 12 and FIG. 13, the female connector part 1 further includes a female socket support 14. The female socket support 14 is housed in the female connector sleeve 12. The female socket support 14 is roughly in a shape of a hollow cylinder. The female socket 11 is installed inside the female socket support 14, and is fastened to the inside of the female connector sleeve 12 by using the female socket support 14, so that the female socket 11 is fastened relative to the female connector sleeve 12.

Referring to FIG. 11, the female connector part 1 further includes a cable sleeve 15. The cable sleeve 15 is installed at an end that is of the female connector sleeve 12 and that is away from the fastening ring 13. A connection wire (for example, the first connection wire 30) of the wireless headset 100 may be connected to the female socket 11 inside the female connector sleeve 12 after passing through the cable sleeve 15. The cable sleeve 15 can protect the connection wire and reduce a risk that the connection wire is broken due to frequent force.

Figure 14:
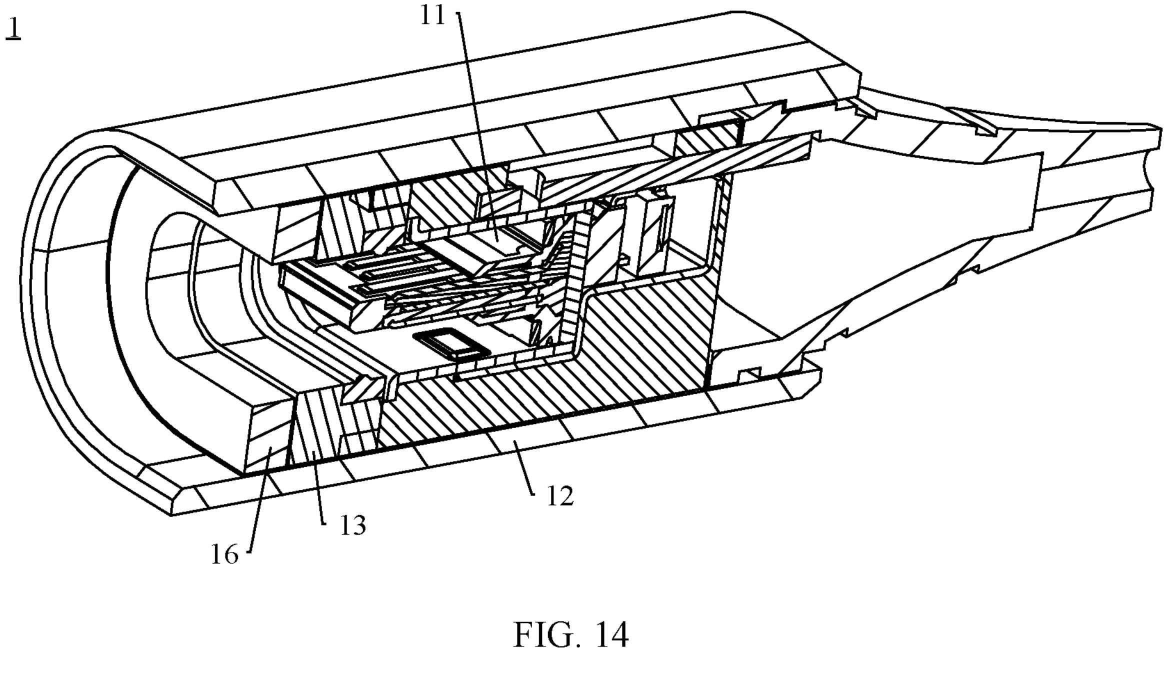
FIG. 14 is a schematic structural diagram of the female connector part of the control box shown in FIG. 3 in another embodiment.

FIG. 14 is a schematic structural diagram of the female connector part 1 of the control box 70 shown in FIG. 3 in another embodiment. Most technical content of the female connector part 1 in this embodiment is the same as that of the foregoing female connector part 1, and therefore is not described again.

The female connector part 1 further includes a stop 16. The stop 16 is in a ring shape. The stop 16 is housed in the female connector sleeve 12. The stop 16 is located on a side that is of the fastening ring 13 and that is away from the female socket 11. When the male connector part 2 is connected to the female connector part 1, the plug end 211 (referring to FIG. 8) of the male connector 21 is connected to the female socket 11 after passing through the stop 16. The extended part 232 (referring to FIG. 8) of the male connector sleeve 23 abuts against the stop 16. In a process in which the male connector part 2 is plugged into the female connector part 1, the extended part 232 of the male connector sleeve 23 may be blocked by using the stop 16, to prevent the plug end 211 of the male connector 21 from being excessively plugged into the female socket 11, so as to avoid damage to the male connector 21 or the female socket 11. Therefore, safety is ensured when the male connector part 2 is plugged into the female connector part 1, and reliability of the control box 70 is improved.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. When no conflict occurs, the implementations of this application and the features in the implementations may be mutually combined. Therefore, the protection scope of the present invention shall be subject to the protection scope of the claims.

What is claimed is:

1. A control box used for a wireless headset, wherein the control box comprises:

a female connector part comprising:

a female connector sleeve; and a female socket housed in the female connector sleeve; and a male connector part detachably connected to the female connector part, wherein the male connector part comprises:

a support having a shape of a hollow cylinder, wherein the support comprises a support body and a support cover, two end parts of the support body each have a complete cylindrical structure, one of the two end parts is disposed around the fixed part, a notch is disposed at a middle part of the support body, the notch connects the inside and the outside of the support body, the support cover covers the notch, and flexural strength of the support body is greater than or equal to flexural strength of the support cover;

a male connector sleeve comprising a fixed part and an extended part connected to one end of the fixed part, wherein the fixed part is housed in the support, and the extended part is outside the support; and a male connector comprising a plug end and a fixed end connected to one end of the plug end, wherein the plug end is outside the support, the fixed end is fastened inside the fixed part after passing through the extended part, the plug end is housed in the female connector part when the male connector part is connected to the female connector part, and the plug end is configured to plug into a power supply device when the male connector part is detached from the female connector part, and when the male connector part is connected to the female connector part, a part or all of the extended part is housed in the female connector sleeve, and the plug end is housed in the female connector sleeve and is connected to the female socket.

2. The control box according to claim 1, wherein the male connector part further comprises a first adhesive layer, the first adhesive layer is located between the male connector and the male connector sleeve, and the male connector adheres to the male connector sleeve by the first adhesive layer.

3. The control box according to claim 1, wherein the male connector part further comprises a second adhesive layer, the second adhesive layer is located between the male connector sleeve and the support, and the male connector sleeve adheres to the support by the second adhesive layer.

4. The control box according to claim 1, wherein the male connector part further comprises a protective cover, the protective cover is installed outside the support and covers the support cover, and flexural strength of the protective cover is greater than or equal to the flexural strength of the support cover.

5. The control box according to claim 4, wherein one end part of the protective cover is disposed partially around the fixed part.

6. A control box used for a wireless headset, wherein the control box comprises:

a female connector part comprising:

a female connector sleeve; and a female socket housed in the female connector sleeve; and a male connector part detachably connected to the female connector part, wherein the male connector part comprises:

a support having a shape of a hollow cylinder;

a male connector sleeve comprising a fixed part and an extended part connected to one end of the fixed part, wherein the fixed part is housed in the support, and the extended part is outside the support; and a male connector comprising a plug end and a fixed end connected to one end of the plug end, wherein the plug end is outside the support, the fixed end is fastened inside the fixed part after passing through the extended part, the plug end is housed in the female connector part when the male connector part is connected to the female connector part, and the plug end is configured to plug into a power supply device when the male connector part is detached from the female connector part, and when the male connector part is connected to the female connector part, a part or all of the extended part is housed in the female connector sleeve, and the plug end is housed in the female connector sleeve and is connected to the female socket;

wherein the male connector part further comprises a protective cover, the protective cover is installed outside the support and extends from one end of the support to the other end of the support, and flexural strength of the protective cover is greater than or equal to flexural strength of the support.

7. The control box according to claim 4, wherein:

a first projection of an outer surface of the support on a first plane has a first length a second projection, on the first plane, of a region that is of the support and that is covered by the protective cover has a second length, a percentage of the second length to the first length is greater than or equal to 50%, and the first plane is perpendicular to an extension direction of the support.

8. The control box according to claim 4, wherein the male connector part further comprises a third adhesive layer, the third adhesive layer is located between the protective cover and the support, and the protective cover adheres to the support by the third adhesive layer.

9. The control box according to claim 1, wherein the control box further comprises a first waterproof ring, the first waterproof ring is circularly fastened to an outer sidewall of the extended part, and when the male connector part is connected to the female connector part, the first waterproof ring is tightly pressed between the extended part and the female connector sleeve.

10. The control box according to claim 9, wherein the first waterproof ring comprises:

a sealing ring body;

and a plurality of position-limiting blocks, the plurality of position-limiting blocks located on an inner side surface of the sealing ring body at intervals, wherein a concave groove and a plurality of position-limiting grooves are disposed on the outer sidewall of the extended part, the concave groove is a circular groove, the plurality of position-limiting grooves are located inside the concave groove at intervals and are connected to the concave groove, a part of the sealing ring body is housed in the concave groove, and the plurality of position-limiting blocks are housed in the plurality of position-limiting grooves in a one-to-one correspondence.

11. The control box according to claim 1, wherein the control box further comprises a second waterproof ring, and the female connector part further comprises a fastening ring housed in the female connector sleeve, wherein the second waterproof ring is fastened to an inner sidewall of the fastening ring, when the male connector part is connected to the female connector part, the male connector is plugged into the female socket after passing through the second waterproof ring, and the second waterproof ring is tightly pressed between the fastening ring and the male connector.

12. The control box according to claim 11, wherein the fastening ring has a first sidewall facing the female socket, a circular slot is disposed on the inner sidewall of the fastening ring, the circular slot extends to the first sidewall, a part of the second waterproof ring is housed in the circular slot, the female socket has a housing, a circular flange is formed at an end of the housing that faces the fastening ring, and a part or all of the circular flange faces the second waterproof ring.

13. The control box according to claim 12, wherein the second waterproof ring comprises a positioning part and a sealing part, the positioning part is fastened to the circular slot, the sealing part is circularly located on an inner side surface of the positioning part, and a width of the positioning part is greater than twice a width of the sealing part.

14. The control box according to claim 13, wherein the second waterproof ring further comprises a plurality of reinforcing parts, the plurality of reinforcing parts are located on an outer side surface of the positioning part at intervals, the fastening ring further has a plurality of reinforcing grooves connected to the circular slot, the plurality of reinforcing grooves are disposed at intervals from each other and all extend to the first sidewall, and the plurality of reinforcing parts are housed in the plurality of reinforcing grooves in a one-to-one correspondence.

15. The control box according to claim 1, wherein the male connector part further comprises a circuit board and a control module located on the circuit board, and the circuit board and the control module are housed in the support; and the control module comprises at least one processor, at least one memory, a wireless communications module, an audio management module, and a power management module, the at least one memory is configured to store program code, the at least one processor is configured to execute the program code, the wireless communications module is configured to support data exchange in wireless communication between the control box and a paired device, the audio management module is configured to manage audio data, and the power management module is configured to receive charging input or output power by using the male connector.

16. The control box according to claim 1, wherein the support has a first outer diameter in a first direction, the support has a second outer diameter in a second direction, the first direction is perpendicular to an extension direction of the support, the second direction is perpendicular to the first direction and the extension direction of the support, and a ratio of the second outer diameter to the first outer diameter is in a range from 1.5 to 2.5, the range comprising 1.5 and 2.5.

17. A wireless headset, comprising a neckband wire, a battery case, a first connection wire, a first earpiece, a second connection wire, a second earpiece, and a control box, wherein the control box comprises:

a female connector part comprising:

a female connector sleeve; and a female socket housed in the female connector sleeve; and a male connector part detachably connected to the female connector part, wherein the male connector part comprises:

a support having a shape of a hollow cylinder, wherein the support comprises a support body and a support cover, two end parts of the support body each have a complete cylindrical structure, one of the two end parts is disposed around the fixed part, a notch is disposed at a middle part of the support body, the notch connects the inside and the outside of the support body, the support cover covers the notch, and flexural strength of the support body is greater than or equal to flexural strength of the support cover;

a male connector sleeve comprising a fixed part and an extended part connected to one end of the fixed part, wherein the fixed part is housed in the support, and the extended part is outside the support; and a male connector comprising a plug end and a fixed end connected to one end of the plug end, wherein the plug end is outside the support, the fixed end is fastened inside the fixed part after passing through the extended part, the plug end is housed in the female connector part when the male connector part is connected to the female connector part, and the plug end is configured to plug into a power supply device when the male connector part is detached from the female connector part, and when the male connector part is connected to the female connector part, a part or all of the extended part is housed in the female connector sleeve, and the plug end is housed in the female connector sleeve and is connected to the female socket.

18. The wireless headset according to claim 17, wherein a battery is disposed in the battery case, two ends of the battery case are separately connected to one end of the neckband wire and one end of the first connection wire, the first earpiece is connected to the other end of the first connection wire, the male connector part of the control box is connected to the other end of the neckband wire, the male connector is electrically connected to the battery, and the female connector part and the second earpiece are separately connected to two ends of the second connection wire.

19. The wireless headset according to claim 17, wherein the male connector part further comprises a first adhesive layer, the first adhesive layer is located between the male connector and the male connector sleeve, and the male connector adheres to the male connector sleeve by the first adhesive layer.

* * * * *